United States Patent
Wilmot, II

[11] Patent Number: 5,974,538
[45] Date of Patent: *Oct. 26, 1999

[54] METHOD AND APPARATUS FOR ANNOTATING OPERANDS IN A COMPUTER SYSTEM WITH SOURCE INSTRUCTION IDENTIFIERS

[76] Inventor: Richard Byron Wilmot, II, 3130 Withers Ave., Lafayette, Calif. 94549

[ * ] Notice: This patent issued on a continued prosecution application filed under 37 CFR 1.53(d), and is subject to the twenty year patent term provisions of 35 U.S.C. 154(a)(2).

[21] Appl. No.: 08/804,175

[22] Filed: Feb. 21, 1997

[51] Int. Cl.$^6$ ............................................. G06F 9/38
[52] U.S. Cl. ........................... 712/218; 712/217; 712/241
[58] Field of Search ..................................... 395/394, 395, 395/393, 392, 377, 588; 712/218, 219, 217, 216, 201, 241

[56] References Cited

U.S. PATENT DOCUMENTS

| | | |
|---|---|---|
| 4,430,706 | 2/1984 | Sand . |
| 4,755,966 | 7/1988 | Lee et al. . |
| 4,858,104 | 8/1989 | Matsuo et al. . |
| 4,891,753 | 1/1990 | Budde et al. . |
| 4,914,579 | 4/1990 | Putrino et al. . |

(List continued on next page.)

FOREIGN PATENT DOCUMENTS

| | | |
|---|---|---|
| 0523337 A2 | 1/1993 | European Pat. Off. . |
| 0586057 A2 | 3/1994 | European Pat. Off. . |
| 0605866 A1 | 7/1994 | European Pat. Off. . |
| 0605867 A1 | 7/1994 | European Pat. Off. . |
| 0605873 A1 | 7/1994 | European Pat. Off. . |

(List continued on next page.)

OTHER PUBLICATIONS

Corporaal, Henk and Hans (J. M.) Mulder, "MOVE: A framework for high–performance processor design", *Supercomputing 1991*, IEEE Computer Society.

Intel Corporation, "The P6 for Servers", 1995 from Intel CD Rom IAL Apr. 1995 "Special Edition P6 Processor Software Developer CD".

Johnson, Mike, *Superscalar Microprocessor Design*, PTR Prentice–Hall, New Jersey, 1991.

(List continued on next page.)

*Primary Examiner*—Richard L. Ellis
*Attorney, Agent, or Firm*—David E. Lovejoy

[57] ABSTRACT

A method for forwarding operands directly between instructions operates in a computer central processing unit. Values for registers, condition codes, stack locations and memory storage locations are routed directly from the program instructions or microcode that alter them to the instructions that use those operands. Instructions that have received all needed operands are started and their resulting output operands are forwarded to other instructions. With direct forwarding of operands, normal locations for operands may often be skipped so that simpler designs can be employed in constructing the operand storage for register files and stacks. Operands receiving newer values never appear in program-visible locations if the prior values were forwarded to all instructions that might need them and those receiving instructions are completed. In executing program loops, loop-dependent variables are identified. A method is shown whereby multiple loop-dependent operands are computed substantially simultaneously. In favorable circumstances multiple iterations of one or more loops are executed in parallel. The number of iterations is computed and then governs the number of loop iterations executed. Storage of results in architected, generally available areas is avoided where operands are no longer needed after loop iteration execution.

85 Claims, 21 Drawing Sheets

U.S. PATENT DOCUMENTS

| | | |
|---|---|---|
| 5,072,364 | 12/1991 | Jardine et al. . |
| 5,093,778 | 3/1992 | Favor et al. . |
| 5,129,067 | 7/1992 | Johnson . |
| 5,136,697 | 8/1992 | Johnson . |
| 5,193,167 | 3/1993 | Sites et al. . |
| 5,201,057 | 4/1993 | Uht . |
| 5,222,240 | 6/1993 | Patel . |
| 5,283,873 | 2/1994 | Steely, Jr. et al. . |
| 5,283,874 | 2/1994 | Hammond . |
| 5,287,467 | 2/1994 | Blaner et al. . |
| 5,295,248 | 3/1994 | Miyamori . |
| 5,327,547 | 7/1994 | Stiles et al. . |
| 5,333,283 | 7/1994 | Emma et al. . |

FOREIGN PATENT DOCUMENTS

| | | |
|---|---|---|
| 0605874 A1 | 7/1994 | European Pat. Off. . |
| 0605875 A1 | 7/1994 | European Pat. Off. . |
| 0605876 A1 | 7/1994 | European Pat. Off. . |
| 2241801 | 9/1991 | United Kingdom . |
| 2263565 | 7/1993 | United Kingdom . |
| 2269924 | 2/1994 | United Kingdom . |
| WO 93/17385 | 2/1993 | WIPO . |
| 0605868 A1 | 7/1994 | WIPO . |
| 0605870 A1 | 7/1994 | WIPO . |
| WO 94/16384 | 7/1994 | WIPO . |

OTHER PUBLICATIONS

Lam, Monica and Robert P. Wilson, "Limits of Control Flow on Parallelism", *The 19$^{th}$ Annual International Symposium on Computer Architecture Proceedings,* 1992, ACM.

Murakami, Kazuaki, et al, "SIMP (Single Instruction stream/ Multiple Instruction Pipelining): A Novel High–Speed Single–Processor Architecture", *The 16$^{th}$ Annual International Symposium on Computer Architecture Proceedings,* 1989, ACM.

Uht, Augustus K., et al, "Branch Effect Reduction Techniques", *Computer,* May, 1997 IEEE (0018–9162/97).

Lightner, Bruce D., *The Metaflow Lightning Chipset,* IEEE, 1991, pp. 13–18.

Popescu et al., *The Metaflow Architecture,* IEEE Micro, 1991, pp. 10–13 and 63–73.

FIG. 8a

INSTRUCTION LINKED MAPPING STORAGE

| | INSTRUCTION | | LINK | | MAPPING | LINK |
|---|---|---|---|---|---|---|
| 801 | R1 = 16 | 804 | 807 | 807 | R1 TO 802 | 808 |
| 802 | R3 = 8(R1) | 805 | -- | 808 | R1 TO 803 | -- |
| 803 | R4 = R1 + 24 | 806 | -- | | | |

FIG. 8b

HASHED MAPPING STORAGE

| | INSTRUCTION | | MAPPING | LINK |
|---|---|---|---|---|
| 821 | R1 = 16 | 824 | -- | -- |
| 822 | R3 = 8(R1) | 825 | -- | -- |
| 823 | R4 = R1 + 24 | 826 | R1 TO 822 | 827 |
| | | 827 | R1 TO 823 | -- |

METHOD AND APPARATUS FOR ANNOTATING OPERANDS IN A COMPUTER SYSTEM WITH SOURCE INSTRUCTION IDENTIFIERS

BACKGROUND OF THE INVENTION

This invention relates to computers and computer system central processing units especially as to methods and apparatus for the forwarding of operands between instructions and for prediction and out-of-order execution of instructions.

1. Description of the Prior Art

A typical computer includes a register file, a memory and cache unit, an input-output unit and multiple instruction execution units. A number of strategies have been used to increase the speed of program execution in computer systems. Instruction execution is usually carried out in a pipeline wherein a portion of the work of each instruction is accomplished in each of the stages. Within the past few years, many computer systems have employed multiple pipelines (superscalar) so that more than one instruction can be started at each basic cycle of the processing unit. Because conditional branch instructions are encountered with great frequency in typical computer programs, much design effort has concentrated on predicting the directions that branching instructions will take prior to their actual execution so that a longer stream of instructions can be readied and fed to the multiple execution units. A prediction mechanism that guesses wrong can cause a stall in the feeding of instructions to the execution pipelines and a consequent fall-off in performance. A problem in designing superscalar computers is that the instructions to be executed in parallel may depend on each other. When one instruction needs the results from another instruction which has not yet completed, the computer system must detect this dependency and arrange for the dependent instruction to wait for that result and then resume or start execution. This operation increases the complexity of the logic used to govern instruction flow. Some computer systems can execute instructions out-of-order. If an instruction is blocked because a needed operand is not yet available, then some instruction occurring after that in program order but that is not blocked will be started. Such out-of-order execution can also mask the effects of having to wait for slow actions such as accessing the main memory. But out-of-order execution increases the complexity of the logic. Out-of-order execution may be accompanied by means for retiring instructions (materializing their results) in program order as is done in the Intel P6.

FIG. 1A shows the organization of a modern superscalar processor from the prior art. In that processor, instructions are fetched by the instruction fetch unit 103 through the bus interface 102 and are decoded by the instruction decode unit 104. The fetch 103 and decode 104 units operate in program order. Decoded instructions are sent to the register alias table 106 where logical register references are converted to physical register references. The resulting instructions are a pool of instructions stored in the reorder buffer 105 which is implemented as a content-addressable memory. The reservation station 107 selects operations from the instruction pool in the reorder buffer 105 depending on their status. If an operation has all its operands ready and an execution (pipeline) unit of the correct type is available, then the operation is removed from the reorder buffer and sent to the available execution unit 112, 113. Operation of the reservation station and execution pipelines is an out-of-order process based on dataflow (operand availability) constraints and resource (execution unit) availability without regard to original ordering of the program. This means that the processor can make forward progress and be doing useful work even while some instructions are awaiting the delivery of operands from memory or from execution units. The reservation station unit 107 will look 20 to 30 instructions ahead in the reorder buffer (105) to find instructions that can be executed. Results of instruction execution are sent to the reorder and retirement unit 114 where they await retirement of their predecessor instructions in program order.

To effectively process instructions well ahead of the current program (retirement) counter, superscalar processors such as shown in FIG. 1A must guess the directions of many future conditional branch instructions. Such branch predictions can be made with a high degree of accuracy but the cumulative accuracy falls off markedly as the number of consecutive branches that must be correctly guessed increases. If the directions of two consecutive branches are each guessed with 90% accuracy then the correct direction through both branches is only 81% accurate.

Another performance improvement strategy has been to pack multiple instructions into long packets of instructions and then to fetch and execute these instructions in parallel. This 'very long instruction word' (VLIW) approach leaves the determination of which instructions will be executed together to a specialize compiler program. The necessity of recompiling means that old programs cannot easily exploit very-long-instruction-width architectures. VLIW machines are also limited to executing a single instruction stream.

A third approach allows operands to flow among instructions. Any instruction which has all of its input operands available is stare as soon as the operands become ready and an execution unit becomes available. This data flow technique will lead to high degrees of parallelism as a large number of operands could be flowing through a system triggering large numbers of instruction executions at nearly the same time. Data flow computers have required the use of special computer languages that can express intended data flows. The need for special, data flow languages and compilers severely limits the usefulness of data flow computers. In the MOVE architecture Corporaal & Mulder explain a data-triggered scheme where operands trigger execution of receiving instructions. Their architecture should provide increased parallelism but requires special compiler programs which must discover the operand flows when programs are compiled. These programs will encode at least some of the data flows without requiring programmers to use special data flow languages. However, existing programs for prior architectures cannot be run on MOVE machines.

A problem in prior art computer microarchitectures is to discover those instructions that are independent of each other and that can be executed together. Determining the independence of pairs of instructions in the prior art requires a number of comparisons that grows much faster than the number of instructions that might be considered for concurrent execution. Increasing the size of the 'window' of instructions being considered for execution requires more than a linear increase in hardware resources when using prior art computer architectures. For the most part, such expensive comparisons are not needed when the method of the present invention is used to map operand flows. Instructions will be started as soon as their operands are ready.

The foregoing and other objects, features and advantages of the invention will be apparent from the following detailed description in conjunction with the drawings.

SUMMARY OF THE INVENTION

The present invention is a computer system and method having an instruction store for storing instructions, instruction fetching means for fetching instructions from the instruction store, and instruction execution means for executing the instructions. An instruction processor includes an annotation store for storing annotations where each annotation includes a source instruction identifier for a source instruction that causes an output operand to be updated with an updated output operand value and includes updating means operating for each update of the output operand to update the source instruction identifier in the annotation.

The present invention maps the flow of operands among instructions in a first Operand Flow Mapping Mode of operation where each operand (such as a register, condition code, vector, stack or memory location) is annotated with an identifier (e.g., address) of the last instruction to modify that operand. When a subsequently executed instruction uses that operand, then a flow pattern is recorded as a flow in a flow mapping store to show that an operand value flows from the instruction that last modified the operand to the instruction that used it.

In a second Anticipation Mode of operation, in subsequent passes through the same code the operand flow mapping is used to direct the forwarding of operand values from the generating instructions to receiving instructions. In Anticipation Mode, upon a result becoming available, the result is forwarded to the receiving instruction or instructions and those instructions are started if they have received all their input operands. This operation implements a far-reaching form of out-of-order execution. The operand-forwarding and triggering mechanism can potentially begin the execution of instructions that are separated from the sending instruction by tens, hundreds or thousands of intervening instructions. Such forward triggering can reach 'down' into subroutines and into operating system calls. The operation can initiate the execution of many different streams of instructions. Instructions from two or three or more loops might be executing concurrently since loop control operations are often speedier than calculation or memory operations allowing the triggering of several frontiers of instruction execution.

In a third Loop Explosion Mode of operation, program loops are exploded where previous mapping mode execution of the program loops has shown that loop-dependent variables are changed in regular, predictable ways and where mapping was able to detect a loop control variable and to exactly predict the number of iterations of a loop. In Loop Explosion Mode, instructions in multiple iterations of a loop are dispatched for simultaneous or substantially simultaneous execution. Such gang dispatching can potentially execute all instructions in a loop, except the looping branch which is no longer needed, in parallel. In loop explosion mode, instructions that manipulate loop-dependent operands in regular, iterative ways are not executed. Instead, the loop-dependent operands are calculated in gang fashion and sent to multiple iterations of the instructions that use and are triggered by loop-dependent operands. Results from these loop-triggered instructions are forwarded to respective iterations of instructions that use those results. If a loop has 100 iterations and three instructions in the loop create iteration-dependent results, then in Loop Explosion Mode, up to 300 loop instructions can be dispatched at once if three loop exploders with width 100 and 300 execution pipelines are all available.

A fourth Speculation Mode of operation uses the operand flows established by previous execution in operand mapping mode but does not wait for the paths through conditional branch instructions to be decided. In this mode, a prediction is made as to which path a branch instruction will take and operands that would be forwarded if the branch went as predicted are forwarded as mapped and instructions that would be triggered after completion of a branch took the predicted path are triggered. Likewise instructions that are executed by an advancing program counter in sequential execution after a predicted branch are executed along the predicted branch path. Execution in speculation mode allows more parallelism because instructions along predicted paths can execute before the paths from branch instructions are known. This can, depending on the composition of the program code and the accuracy of the branch predictions, lead to higher throughput; but when branch paths are mispredicted, execution in speculation mode can make less progress through some programs where speculative results must too often be discarded and further execution is slowed by having to await execution of the actual paths. Speculation mode can be combined with execution in loop explosion mode where speculation mode execution encounters a previously mapped loop that is eligible for loop explosion treatment.

BRIEF DESCRIPTION OF THE DRAWINGS

FIG. 8 depicts a map storage.

DETAILED DESCRIPTION

Computer Block Diagram

Figure 1A:
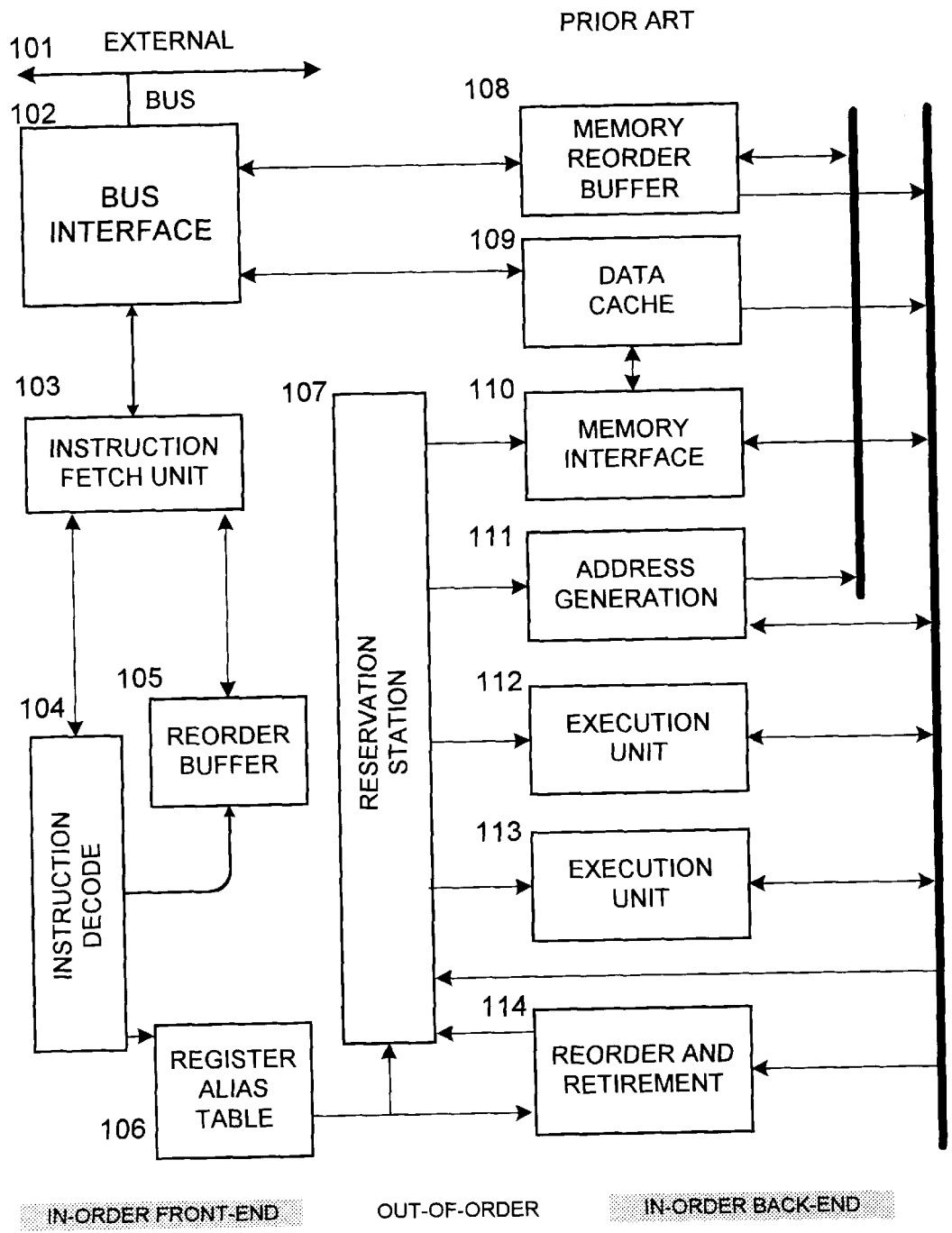
FIG. 1 depicts a prior art superscalar processor design.
FIG. 1B depicts a block diagram of a computer system according to the present invention.
Figure 1B:
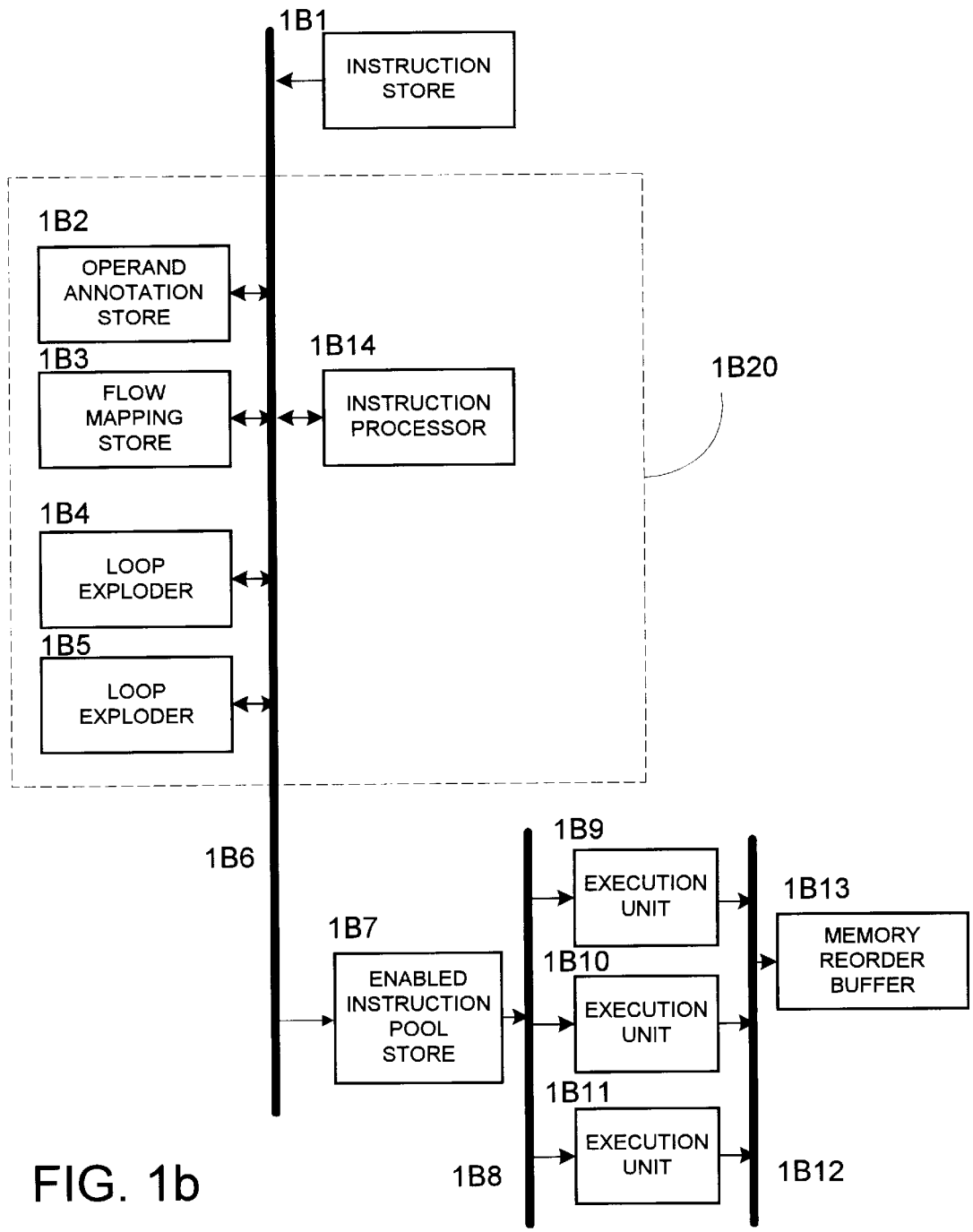

In FIG. 1B, a block diagram representation of the present invention is shown. The computer system includes an instruction store 1B1 connected to a bus 1B6 for storing instructions that are to be executed in the computer system. The computer system includes an instruction processing means 1B20 connected to bus 1B6 for fetching instructions from the instruction store and for processing the instructions for execution. The computer system includes an enabled instruction pool store 1B7 connected to bus 1B6 which stores the pool of instructions to be executed. Instructions from the pool store 1B7 connect over bus 1B8 to the one or more execution units such as execution units 1B9, 1B10 and 1B11. The output from the instruction units is via the bus 1B12 to the memory reorder buffer 1B13.

In FIG. 1B, the instruction processing means 1B20 includes an operand annotation store 1B2, a flow mapping store 1B3, one or more loop exploders such as loop exploders 1B4 and 1B5, and an instruction processor 1B14 all connected to bus 1B6. The instruction processor 1B14 among other things controls the operation of the operand annotation store 1B2 and the flow mapping store 1B3. The annotation store 1B2 stores annotations where each annotation includes a source instruction identifier for a source instruction that causes an output operand to be updated with an updated output operand value. The instruction processor functions as an updating means operating for each update of the output operand to update the source instruction identifier in the annotation store 1B2.

Mapping Phase and Operand Flow Mapping Mode

Prior to code being executed in anticipation mode, loop explosion mode or speculation mode, it must be executed in an Operand Flow Mapping mode or be mapped by other means. Different segments or runs of program code may be mapped at different times and some portions of programs might never be executed and so might never be mapped. Flow mapping mode is normal instruction execution with the added function of determining the source instructions for input operand values used by the current instruction. As most computer instructions execute, they cause branching and/or modification to stored information. Instructions may modify stored information in the form of registers which are altered. They may push or pop information to or from a stack. They may change machine state to indicate supervisor or user status. Registers may be copied into memory locations and the contents of one memory location may be copied to another memory location with possible changes en route from the one location to the destination location. Other types of instructions might directly set the contents of memory locations to certain values such as in a 'clear memory' instruction. The Condition Codes used in some computer architectures to record the results of comparison or arithmetic operations are also operands that pass between instructions. They are set by one instruction and used by others. All of these operand flows can be mapped as proceeding from one (operand-altering or sending) instruction to another (operand-using or target) instruction and each of the flows of an operand can be associated with its sending instruction.

Operands that can be mapped include registers, control registers, vectors, storage locations, condition codes, stack locations and the program counter. A computer designer might design a computer to map and forward any one or several of the operand types and not others. A design might also omit mapping in some circumstances. The methods of the present invention allow partial implementation while still providing benefits proportional to the degree of flow mapping.

Execution in flow mapping mode actually carries out the actions dictated by the program's instructions. Operand flow mapping is a side-effect of execution in flow mapping mode. As discussed below, the flow mapping side effect should not appreciably slow program execution. Flow mapping is done with the hope that program execution will again traverse the mapped segment of program code but some parts of some programs may be executed only once before the program is discarded and those flow maps will not be used. But most of the work in computer programs is accomplished by iteration, that is, by repeated execution of parts of programs. In those repeated executions, the flow mappings of the present invention serve to increase parallelism and ready availability of operands.

In some implementations of this invention it may be desirable to treat the program counter (PC) as a register type operand which is forwarded from an instruction to the instruction that should execute next at least for some sequences of instructions. This feature is desirable for immediate assignment instructions (e.g.: R5=18) or other instructions that might start out self-contained loops. Other applications are for unconditional jump instructions or any instruction having no other inputs.

Figure 2:
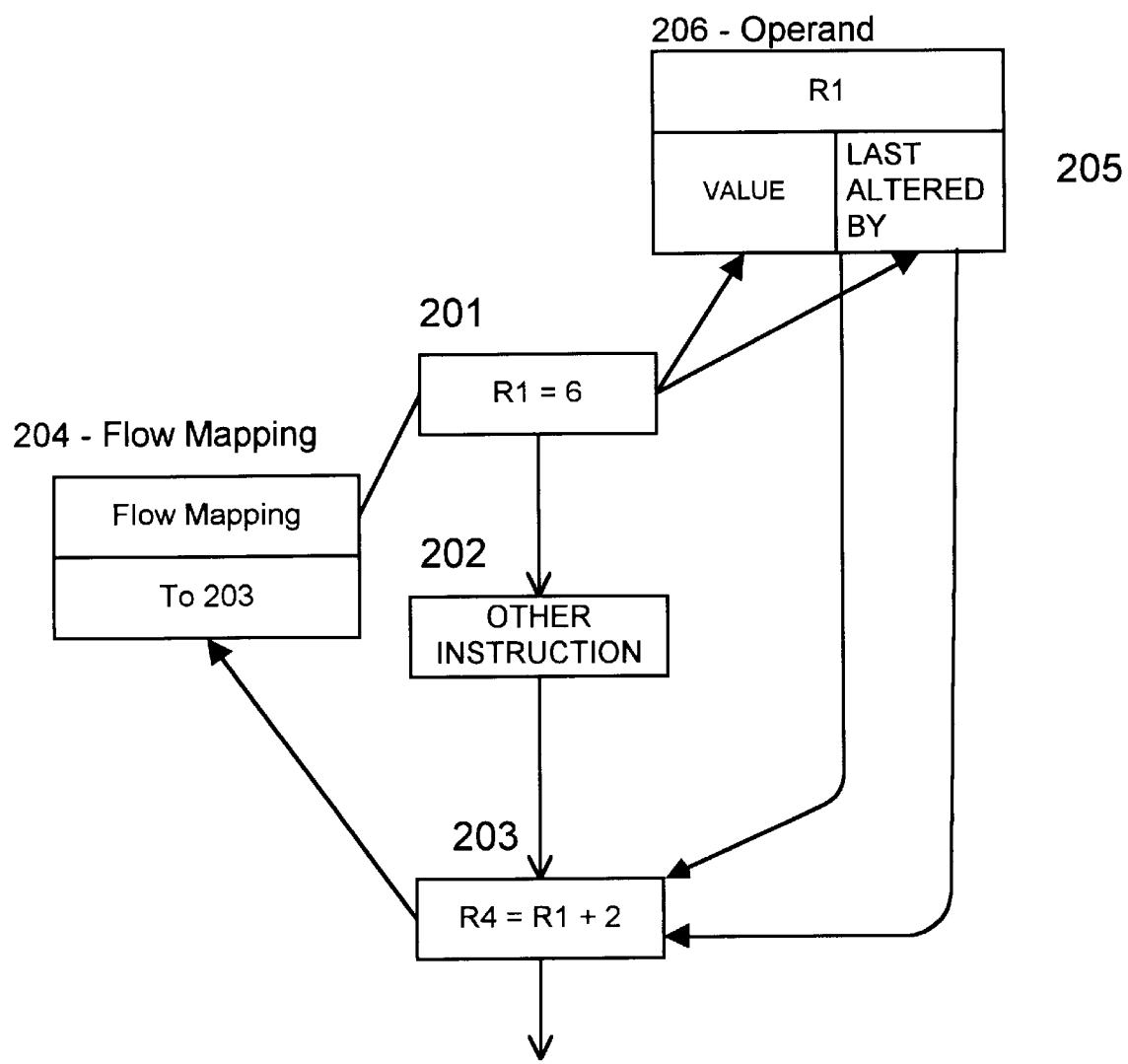
FIG. 2 depicts an operand mapping flow.

As instructions execute in the flow mapping mode, affected operands are annotated with the address of the instruction that last altered each operand's value. When an annotated operand is used by a subsequently executed instruction a flow relationship is established between the operand-altering instruction and the operand-using instruction. Referring to FIG. 2, when instruction 201 is executed in operand flow mapping mode, its operand 206 is annotated with the address of instruction 201 as well as having the stored value updated to the value '6' in that example. One or more unrelated instructions such as 202 may be executed followed by execution of an instruction 203 using the operand 206 as input. As the operand 201 is accessed in operand mapping mode, the address of the last instruction to alter it 205 is also retrieved and used to establish the operand flow. The operand flow 204 is then associated with sending instruction 201.

Operand Fields

Operand flow mappings also associate with each flow the operand's input operand number or field position in the operand-using instruction. Where an instruction has multiple input operands, this association distinguishes between the first operand and the second operand and from the third operand and for as many operands as are used by the instruction. The operands can be thought of as entering receiving Fields in the receiving instructions. Since some instructions have multiple result operands (including condition codes and possible register side-effects) these outputs too are assigned fields to hold results pending final retirement of the instructions. Output fields are designed to enhance multiple instances to accommodate parallelism as when multiple iterations of a loop are proceeding simultaneously.

Operand Branch History

In a more sophisticated embodiment of this invention, the mapping method includes for each operand not only which instruction last altered the operand but also some of the program branching history since that operand was last modified. This branching history allows determination of whether operands can be forwarded and instructions pre-executed in later anticipation mode execution. Certain branching patterns allow determination of whether or not, following execution of a given instruction, another instruction will be executed.

Conditional Execution

Some computer architectures specify a conditional execution feature where an instruction following a conditional skip instruction is skipped. Other computer architectures feature special markings or operation codes for instructions that are to be conditionally skipped following a test or the setting of a condition code. The present invention can fully exploit these features because though these 'skipped' instructions might not be executed, they are traversed and the mapping mode of the present invention is thereby able to determine that there are no underlying branches. The advantage to ensuring the absence of underlying branches is that flows to instructions following the conditionally skipped instructions can be mapped as always flowing while taking a forward branch in mapping mode leaves open the possibility that instructions that were bypassed contained other branches so operand flows cannot be seen to always flow to instructions following the branch target. Mapping conditionally skipped instructions has the benefit of seeing both paths of execution so use of conditionally skipped instructions is better for mapping than use of short forward branches. Operand flows to conditionally skipped instructions are mapped but the triggering flow is the condition code from the preceding test or compare instruction.

Figure 4:
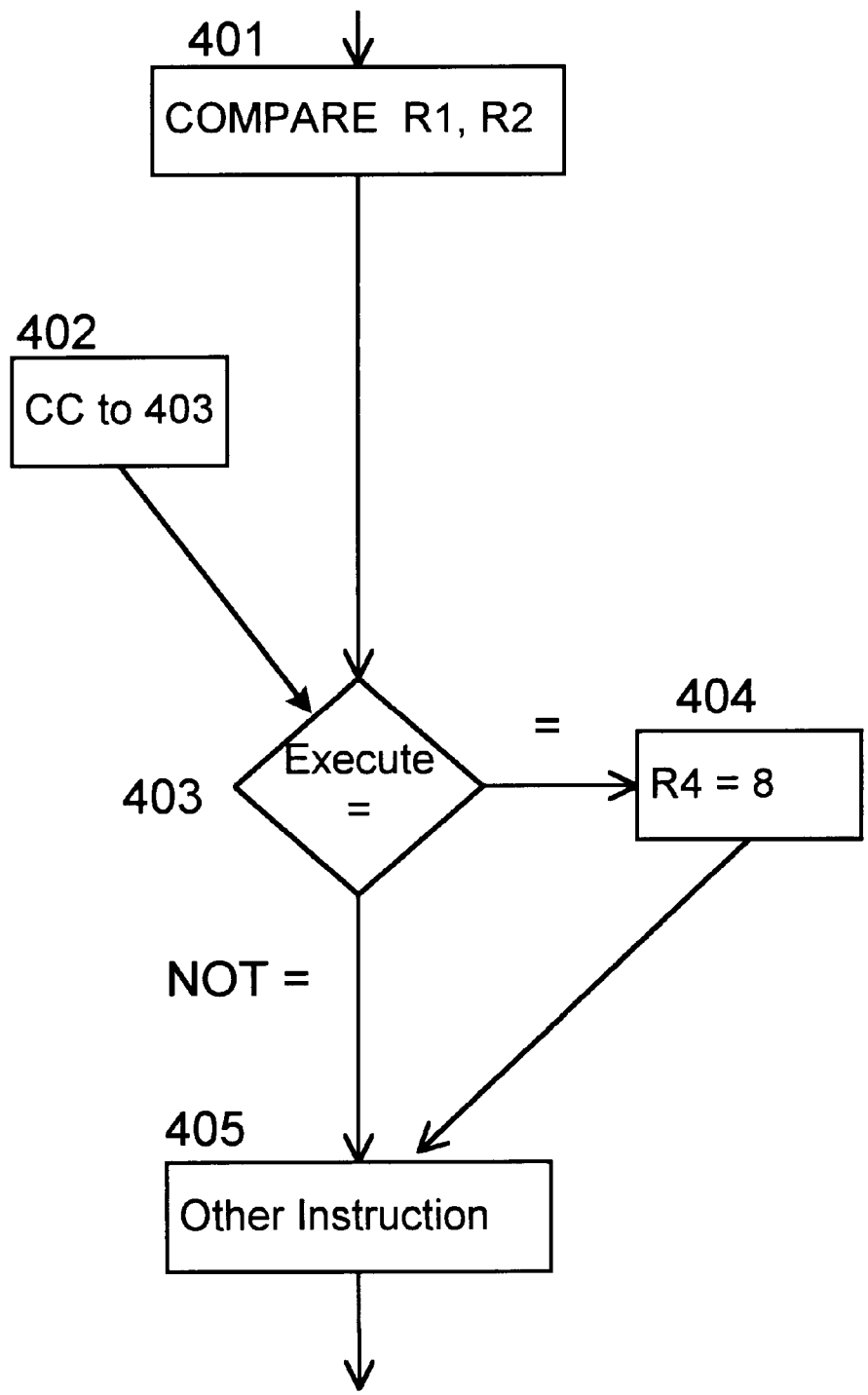
FIG. 4 depicts a conditional execution flow.

In FIG. 4, a compare instruction 401 compares two operands. The result of the comparison is a setting of a condition code. Instruction 403 then uses this condition code as an operand to determine whether instruction 404 should be executed or skipped. Flow of the condition code operand 402 from instruction 401 to instruction 403 will be recorded as a trigger flow.

Mapping Operand Flows Around Branches

Predicting the flow of program control through branches cannot in the general case be determined in advance though effective techniques for guessing directions of branches are known. By keeping a history of branching after operand alteration, the method of the present invention can often map operand and control flow around branch instructions.

Figure 5:
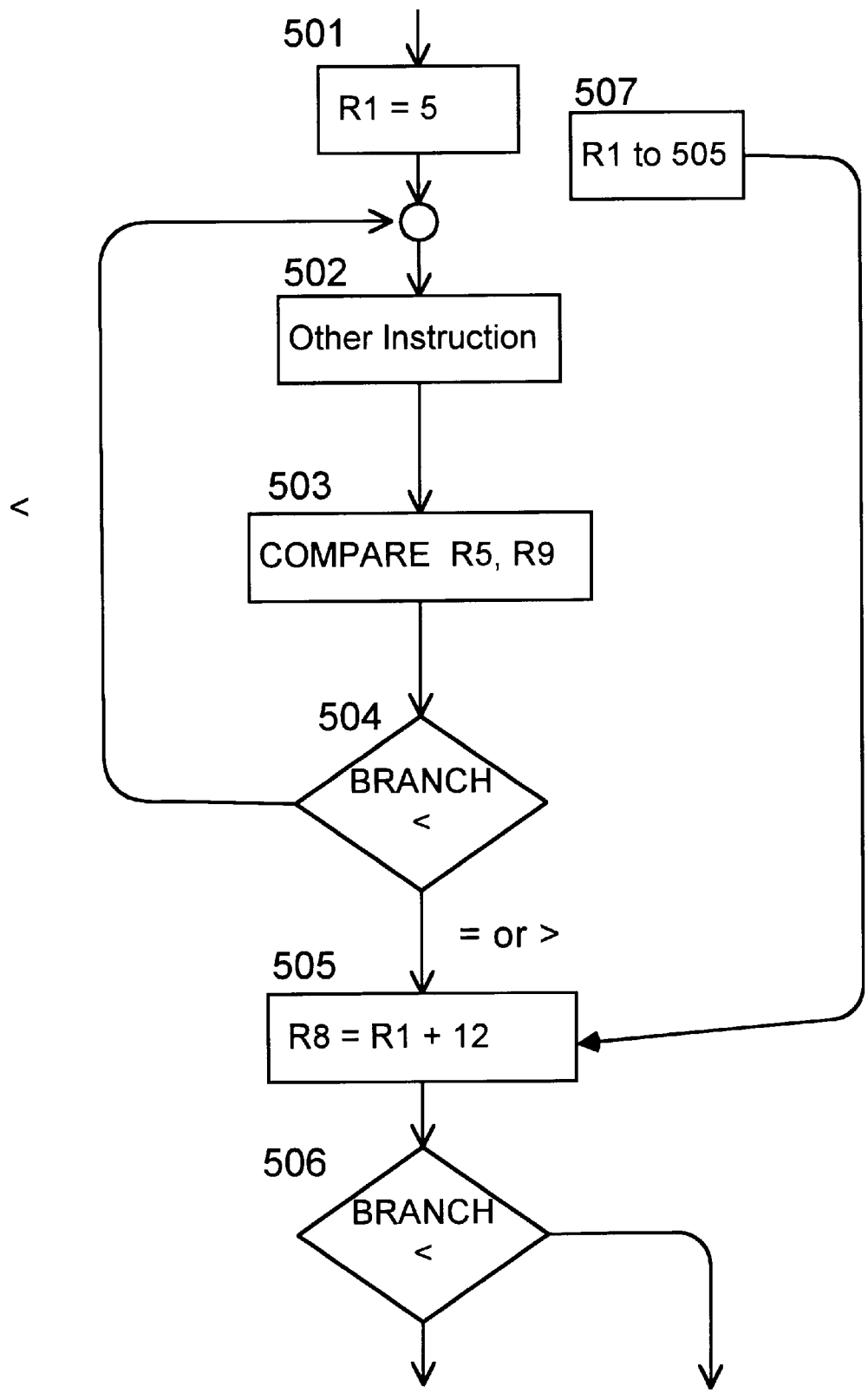
FIG. 5 depicts a mapping around branches flow.

If, as shown in FIG. 5, a branch instruction 504 follows several instructions after a particular operand-modifying instruction 501, but the branch is backward to an instruction 502 after the operand-modifying instruction 501 and there are no other intervening branch instructions from the operand-modifying instruction to the backward (looping) branch 504 then instruction 505 before the next further branch instruction 506 which uses that same operand will, barring any exceptions, receive the value set in the operand by the first instruction 501. When execution in flow mapping mode reaches an operand-using instruction after a conditional backward branch, it will have traversed the entire set of instructions from the first operand-modifying instruction 501 to the operand-using instructions 505 following the branch so there can be no unforeseen branching possibilities in that loop segment of code. In other words, operands not involved in a loop can establish a flow and trigger map around the loop. Later anticipation mode execution of instruction 501 will cause immediate forwarding of the R1 operand 507 to instruction 505 and that will trigger immediate execution of instruction 505 if any execution pipelines are available or make it eligible for execution in an upcoming clock cycle.

Figure 3:
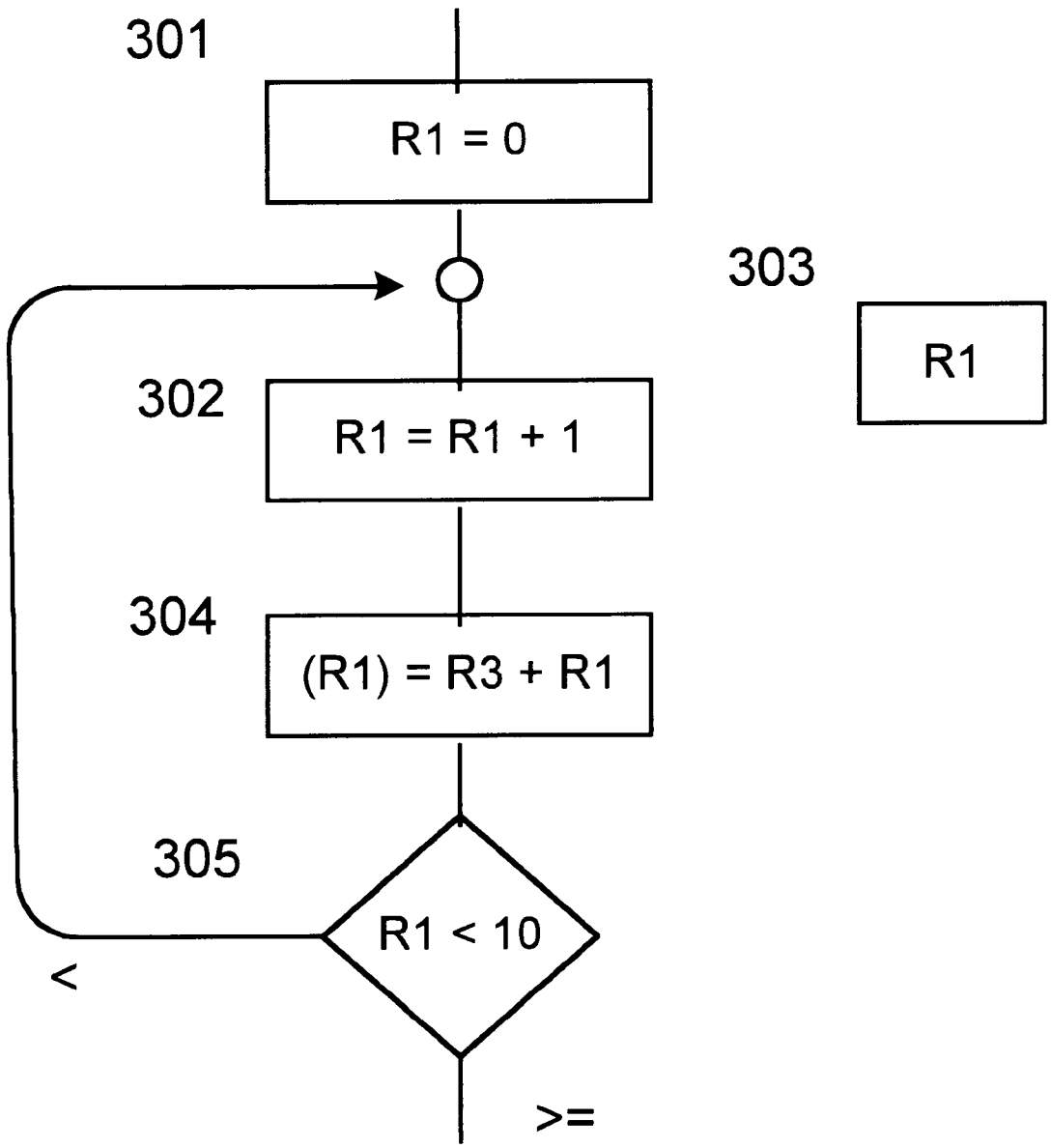
FIG. 3 depicts an operand input to the same loop flow.

When operands are modified within iterations of a loop, those new values might be used by other instructions in the same iteration or in instructions in subsequent iterations of the same loop or in instructions following after termination of the loop or in any combination of these flows. It is also common, as shown in FIG. 3, for an operand 303 to be used as input to the same instruction 302 that produced its new value in a later loop iteration. This is particularly true for a loop limit operand 303 that might be incremented in each iteration, then tested by the loop limit test instruction 305 and then used over again in the next iterations until it exceeds the loop limit. The value might then be used in instructions following the loop to see how many iterations of the loop were actually executed.

When operand values are forwarded to instructions in later loop iterations, the mapping method must distinguish between the iterations. If a loop counter operand value is incremented and the new value passed to the next increment instruction and if that instruction is immediately triggered, then a value from the subsequent iteration is passed to the loop limit test in the prior iteration. Values must flow forward to the correct iteration. This flow can be handled, as discussed below, by forwarding the operands 'via' loop back branches. This operation is also handled by Loop Explosion Mode which is discussed in a section below.

Figure 6:
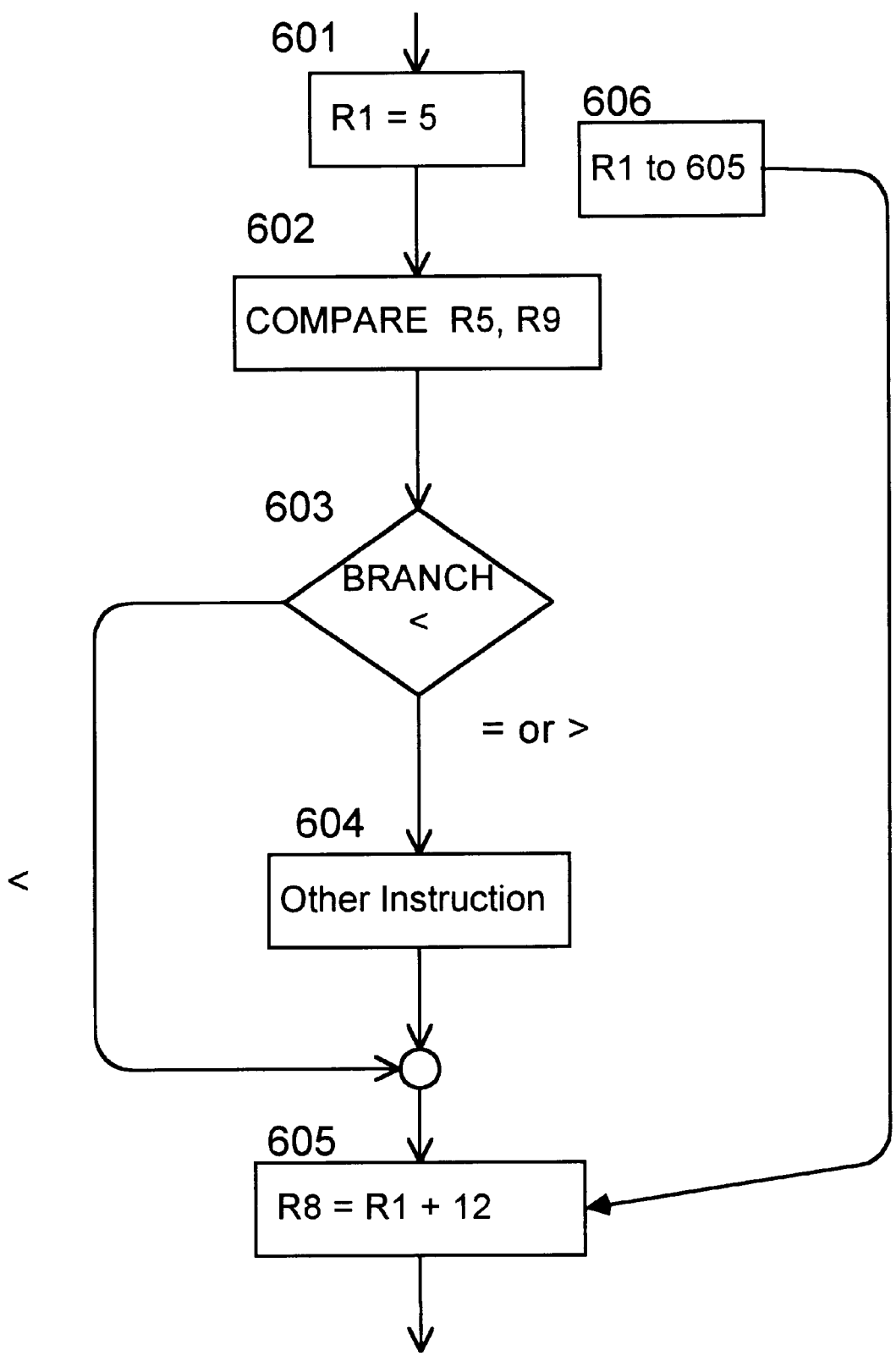
FIG. 6 depicts a mapping around branches flow.

The case is similar for some forward branches as illustrated in FIG. 6. Where a forward branch 603 follows a first, operand-modifying instruction 601 and, in flow mapping mode execution, the forward branch was not taken then the absence of further branches can be ascertained because all the intervening instructions have been executed. If there are no other intervening branches between the branch target address 605 and an instruction 605 at or beyond the branch target address that uses the operand modified by the first operand-modifying instruction 601 and the operand is not modified in the instruction(s) 604 that might be branched, over, then a definite flow 606 can be established so that the operand can be forwarded directly from the first operand-modifying instruction 601 to the operand-using instruction 605. A simple mapping around a forward branch can only be established if the operand-using instruction lies beyond the point where the two possible paths of execution from the branch instruction are rejoined (at the branch target address) so that, barring exceptions, the operand-using instruction will be executed regardless of which path the branch takes.

Forwarding around forward branch instructions is not at all the same as forwarding VIA a branch instruction. A VIA forwarding must wait for the anticipation or regular, mapping mode execution of the via branch whereas a forwarding around a branch will occur immediately upon execution of the instruction that is the source of the forwarded operand.

In cases where operand flows can be mapped beyond intervening branches the present invention achieves superior average parallelism over the branch prediction techniques favored in prior art. The mapping method disclosed here avoids the delays of mispredicted branches that are inevitable in the prior art's dynamic branch prediction and can leap beyond the limits of even lengthy loops where those loop instructions do not affect the operand flows to more distant target instructions.

Mapping around Short Branches

When forward branching instructions are not taken (fall-through), the mapping method can easily determine, as explained above, whether operand flows around the branch can safely be established or whether, in later anticipation mode execuion, it will be necessary to wait until the branch direction (taken or not taken) is determined; mapping flow via instead of around.

But then if, in mapping mode execution, the forward branch is taken, the mapping would have to be VIA the branch and this forward (taken) branching pattern might continue to follow for many executions, thus leaving the flows of operand from before the branch to instructions after the branch target to be delayed until resolution of the branch direction and to not flow at all on first occurrence of a fall-through path. Dozens of operands might thus be delayed by a short foward branch such as would be generated by a program segment such as:

if (condition)

b=a;

where the tested condition is rarely true.

An enhanced mapping method can overcome this limitation to a great degree by exploring down untaken (fall-through) paths of forward conditional and unconditional branches. The mapping method can limit its explorations along untaken fall-through paths by detecting the length of the forward branch the processor is taking either by noting the length of a PC-relative (offset from branch instruction) branch or by computing the difference between the branch target and the branch instruction. The latter computation can be made even shorter by merely noting whether any higher order bits differ between the branch address and the branch target.

Where the branch is sufficiently short, the mapping method explores the untaken fall-through path to see if there are any other branch instructions intervening between the branch instruction and its target. Operand flows for operands that cannot be altered by instructions in the fall-through path can be mapped around intervening backward branches with targets at or after the taken forward branch instruction. The mapping method can even continue mapping with further intervening forward branch instructions so long as their targets are at or before the current actual target instruction.

In exploring instructions between a taken branch and its target, the mapping method is ensuring that there are not intervening branches (forward or backward) that would send a later execution branching outside the operand flow mapping area. Intervening branches to instructions before the currently taken branch instruction or following the current branch target causes a simple mapping method to abandon "mapping around" the taken branch. The exploration process is also ascertaining which operands would be changed by intervening instructions between the taken branch and its target. If the instruction following the forward branch instruction alters register R2, then that operand cannot flow around the forward branch but must be mapped via the forward branch so that, in later anticipation mode exeuction, its value would be passed to instructions following the branch target instruction only after it is determined that the branch will be taken.

Forward branching also occurs in if . . . else . . . programming constructs. This results in overlapping branches where a conditional forward branch is taken around instructions that carry out the actions required when a condition is fulilled. Those instructions end in an unconditional branch around the instructions that implement actions required when the tested condition is not true.

Figure 19:
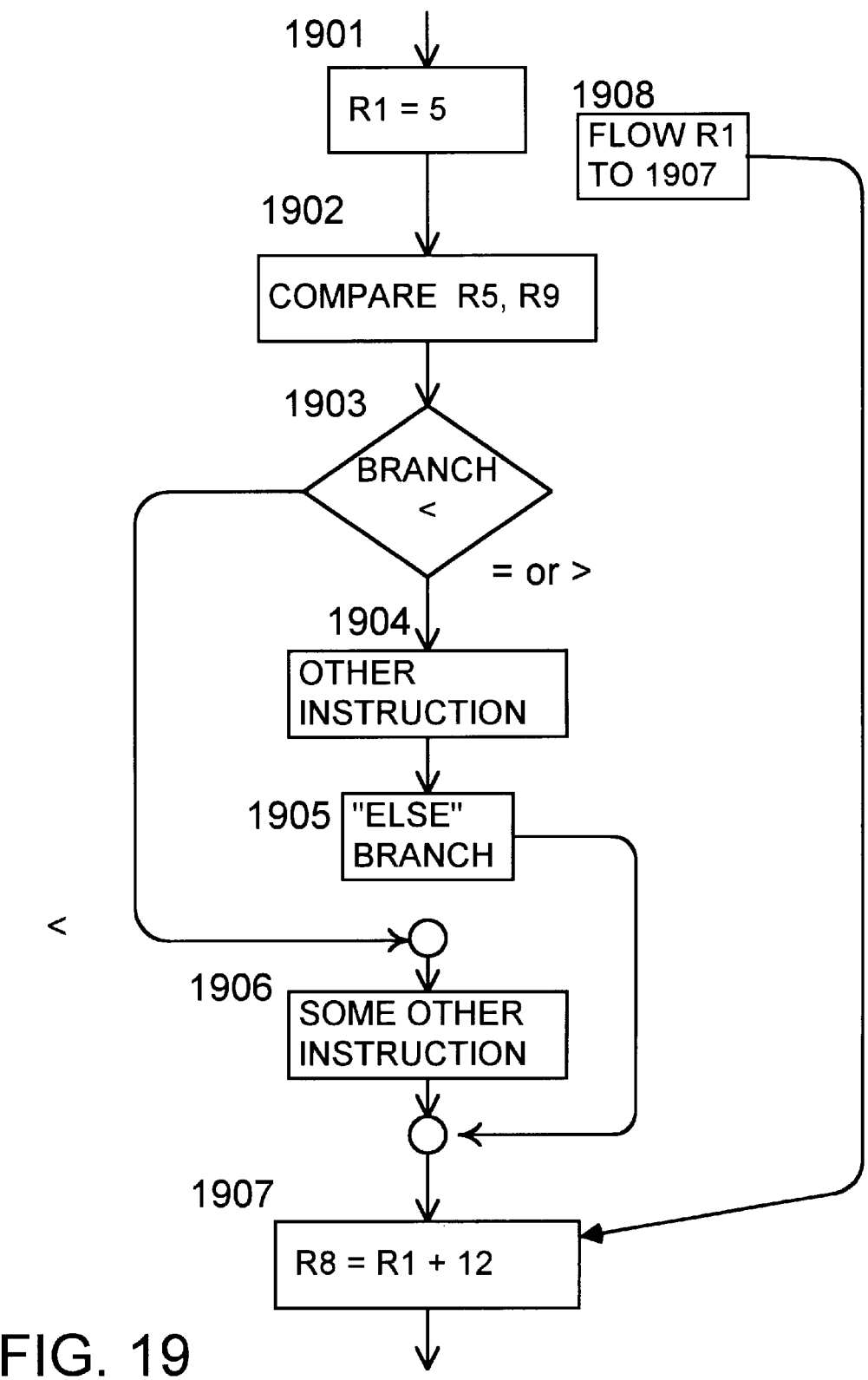
FIG. 19 depicts a mapping around else branches flow.

In FIG. 19, an operand is changed by instruction 1901. This operand will be used in instruction 1907 regardless of the intervening instructions because they don't affect R1. Instruction 1902 compares R5 awith R9 and branches to instruction 1906 if R5 is less than R9. If R5 is greater than or equal to R9, then instruction 1906 if R5 is less than R9. If R5 is greater than or equal to R9, then instruction 1904 is executed but does not alter R1. This is the IF part of the IF . . . ELSE . . . construct. If instruction 1904 is executed, then instruction 1905 causes a branch around instruction 1906. If R5 is less than R9, then instruction 1906 will be executed but will not alter R1 (the ELSE part). Instructions 1904 or 1906 might be several or many instructions but if there are no other branches and R1 would not be altered by any instructions in either path, the more advanced IF . . . ELSE . . . mapping method can determine that, barring exceptions, a flow 1908 will occur from instruction 1901 to instruction 1907. This flow can be mapped (along with potentially many others) and instruction 1907 can begin executing even before the path through the IF . . . ELSE . . . is determined.

This improvement in mapping through alternate path exploration can result in dramatic benefits for parallelism as mapping around does not have to wait for the untaken path from a branch to be actually executed. Some branches will take only one path through even a long program execution. Short branches which are easily explored occur often in many programs and the fall-through paths frequently alter few operands so with this advanced flow mapping technique, many operands can flow AROUND forward branches to trigger anticipation mode out-of-order eecution of many recipient instructions even before the paths' conditional forward branches are determined. This yields a dramatic increase in parallelism with more instructions diring per clock period.

Mapping Transitive Operand Flow

Operand values are sometimes produced in one location and then copied to another. This is especially common in stack-oriented architectures where results of at least some instructions are placed on the top of a stack. This kind of transitive flow can also occur when instruction results can be placed only in one or a small number of registers. Where these results are then copied without change to other locations or even to other types of storage means, such as from register to main memory or stack to register or main memory, then a transitive flow may occur. If some later instruction then uses that result value from its new location and the path of execution from the instruction producing the original value to the instruction using that value can be mapped, then the mapping method can arrange a mapping that will pass the value directly from the value-producing instruction to one or more operand value-using instructions. As with other mappings, the forward of transitive values can trigger execution of the receiving instructions. To detect and map transitive flow, the mapping method will need to annotate operadns to that effect so that during mapping mode execution, both the immediate operand source as well as the original source instructions are known.

Figure 20:
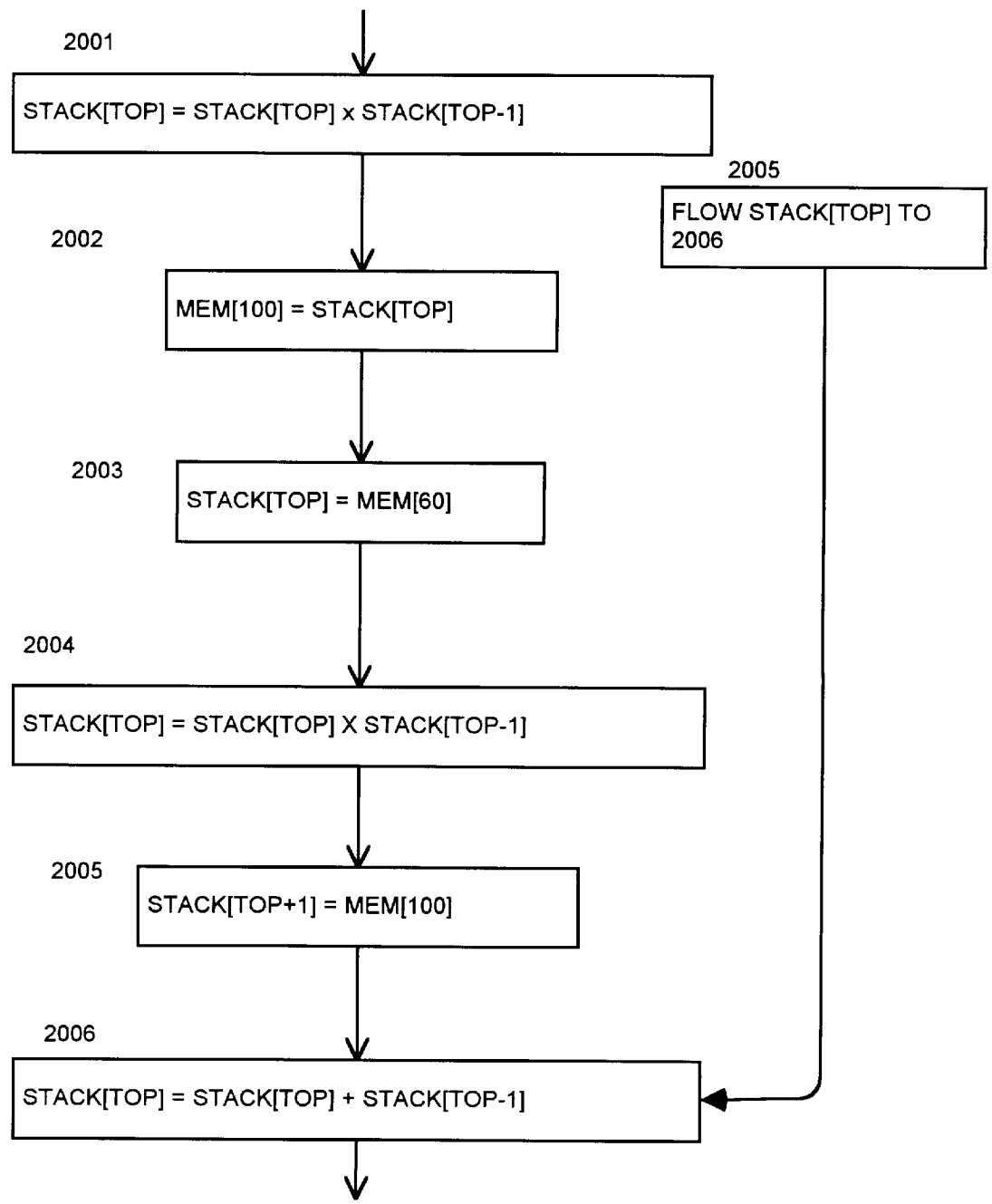
FIG. 20 depicts a mapping transitive operand flow.

Referring to FIG. 20, an operand result is placed 2001 on the top of a stack storage means but is then copied 2002 to a memory means. It is later copied back 2005 from its memory location preparatory to being used from the stack in a further calculation 2006. By annotating the operand (MEM [100]) with the identifies of both the instruction that copied 2002, the value there and the instruction 2001 that originally created the value, the mapping means can detect that a transitive flow exists between instruction 2001 and instruction 2006. When first executing the fragment of code shown in FIG. 20, the mapping method will create a flow mapping that, in subsequent executions, will forward the value 2005 produced in instruction 2001 directly to instruction 2006. The mapping means might also create a flow mapping from instruction 2001 to instruction 2005 in the situation depicted.

Transitive Transformations

Computer programs often make simple transforms on data prior to further use. A single word integer may be expanded to double word size. An integer operand may be transformed to floating point. By annotating the transformed operand with both its immediate (transformed) source as well as its original source instruction, the mapping method can detect and map transitive transformations. Flow mappings can then include indications to effect en route transforms such as conversion from integer to floating point or translation of character data.

Instruction Substitution

Where the mapping method detects that a sequence of one or more executed instructions is exactly equivalent in results to another sequence of one or more instructions that may be faster or less resource intensive, it can create a mapping that substitutes, then it can create a mapping that specifies the second sequence. This substitution will need to be annotated so that no part of it can be retired until the entire sequence is retired and so that the issue mechanism will recognize the substitution and not issue the original sequence of instructions.

Substitution of instructions can allow older programs to benefit from new instructions that are implemented on new computers that execute older instructions and use of the new instructions can be constrained by the flow mapping method which ensures that the new instructions employed only where they will be equivalent to the older instructions.

Using Forwarding Distance

In crafting operand flow mapping capabilities, designers may wish not to have flow mappings created for flows whose target instructions will not be retired until long after the source instruction. It might be better not to occupy flow storage means for long periods. To facilitate such discrimination while executing in flow mapping mode, a retirement meter register can be provided to continuously count the number of instructions retired. Operands would be annotated with the value of the retirement meter as well as with the identity of the source instruction and possibly other data. When the operand is subsequently used by other instructions in the same flow mapping mode execution, then the mapping method readily ascertains the number of instruction executions intervening between the operand source instruction and the operand using instruction and can consequently make a decision on whether to map this flow or that too much time would elapse between creation of the operand value and its use by the prospective flow target. Many program codes are branchy so simple differencing of the addresses between operand source and use instructions would not be a reliable measure of execution distance between operand source and use. The retirement meter register provides a quick measure of execution distance and a rough gauge of expected time between retirement of the source instruction and the flow target instruction being then examined.

Some computer designs may arrange to keep separate retirement meters for each different process or for each different thread.

Retirement meters that are large (e.g., 64 or 128 bits) will not frequently reach their maximum value. When a retirement meter is incremented to its maximum value, the next instruction retirement will cause its value to be set to zero. Following such a reset execution, distances might appear to be extremely large or negative. Some computer designs may simply treat large or negative distances as being ineligible for flow mapping. This strategy should not much affect performance since a frequently used path will be traversed again and the mapping will then most likely succeed with no distance anomalies.

Source and Target

Many instructions will be both operand-modifying instructions and operand-using instructions. An instruction may both use operands modified by previously executed instructions and pass results to subsequently executed instructions. As with a loop counter operand, an instruction can be both supplier and consumer of the same operand.

Operand Flows via Branches

Where operand flow mapping cannot bridge over branches in the above manner it is often possible to establish flows via those intervening branches. When a branch is encountered and either taken or not taken and instructions following the branch are executed in mapping mode and use operands from instructions executed before the branch, then it can be established that, if the same branch path is taken in later executions, certain operands will flow from operand-modifying instructions located before the branch to operand-using instructions following the branch. In the case where operand-using instructions occur before the branch paths rejoin, a flow cannot be directly mapped from operand-sending instruction to operand-using instruction. Unless speculation mode execution is to be done, the flow will be conditional on the path taken through the branch. Such flows can be thought of as proceeding via the intervening branch. This could be implemented by forwarding the operands from the preceding operand-modifying instructions to the branch and thence to the receiving instructions. In a more practical implementation, with less data movement, the branch is annotated with an indication of which flows to activate upon determination of a particular branch path. This annotation is simply and quickly accomplished in mapping mode since, as each operand-receiving instruction is executed, the operand-modifying instruction address and last branch instruction address as well as last branch target address are associated with each operand so the sending instruction can be annotated with the receiving instruction address and that it is 'via' the intervening branch while the branch is being annotated to indicate that subject operand flow is to be activated if the branch path is in the same direction.

Figure 7:
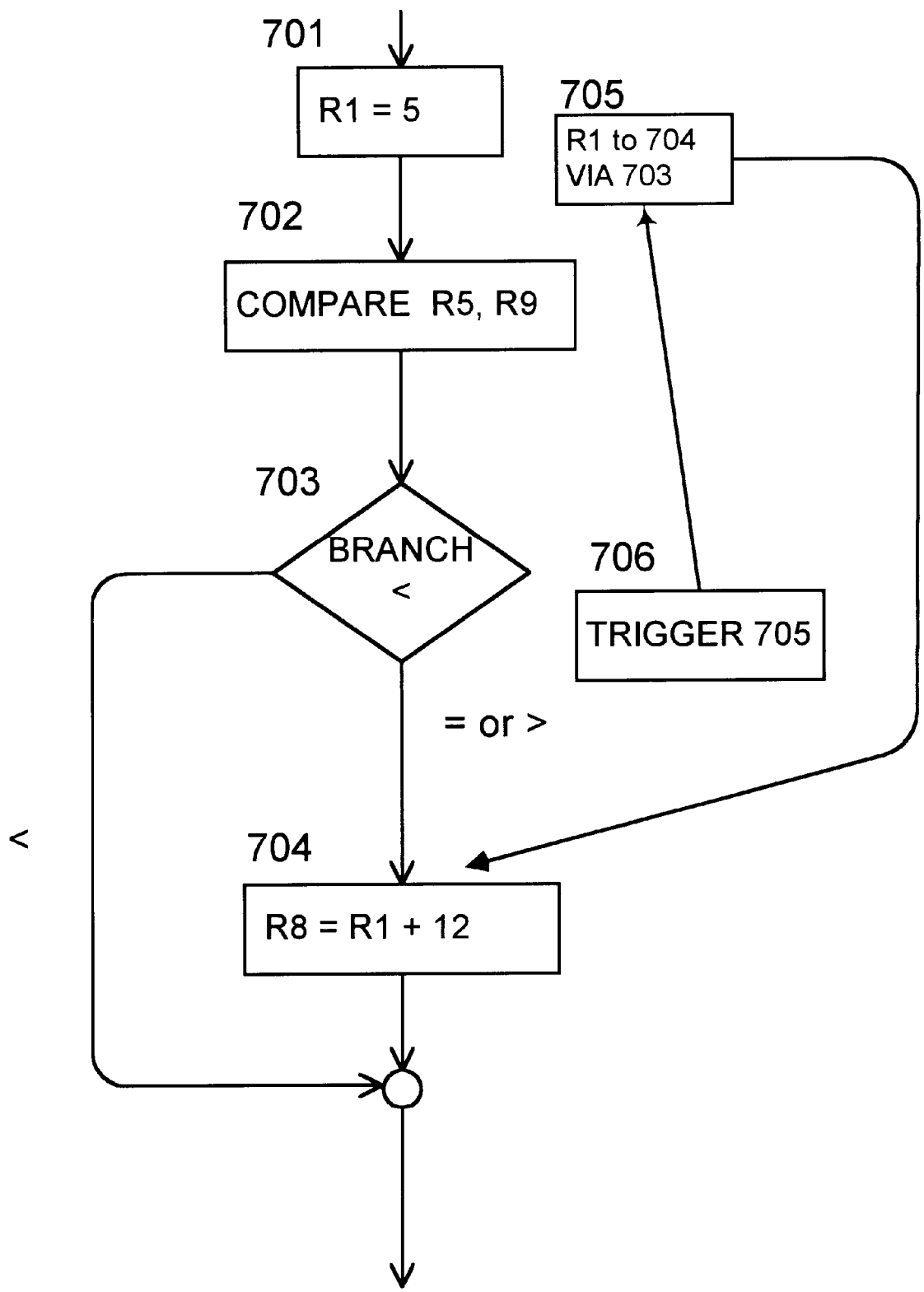
FIG. 7 depicts a mapping via branches flow.

FIG. 7 shows the mapping of an operand flow via a forward branch. After the mapping is established, the 'not taken' path of the branch will be annotated to trigger 706 the activation of the operand flow 705 from instruction 701 to instruction 704. Both the trigger 706 and the operand flow 705 will be mapped by mapping mode execution.

Mapping mode can be extended to cover multiple levels of 'via' branch operand flows.. This should handle the prevalence of branches in most computer programs. In multiple branch forwarding a first branch is annotated with the address of another branch instruction which is later encountered. This later branch is then annotated to associate the addresses of certain sending instructions with a path actually taken through the branch so when that path is taken in subsequent executions, flows can be started from the sending, operand-modifying instructions directly to receiving instructions encountered after being triggered by the last branch.

Forwarding of via mappings can be extended through an arbitrary number of branch instructions since the annotations are arranged as a chain. During mapping mode execution each of the operands could record the history of branches and paths since it was last changed or branch instructions can be chained together in reverse order of their last execution in order to be able to derive the forward chaining that is needed for operand forwarding maps or, for higher performance with less storage use, a single stack of executed branches can be kept to record the branching history for some number of branches and paths taken. In this last embodiment, the operands are annotated either with an indicator that there has been no branching since the operand was last changed or with a stack pointer to the first branch after the operand was changed. When an operand-using instruction is executed in mapping mode following some number of branches after an instruction modifying one of its operands, the branch instructions between the instruction modifying that operand and the operand-using instruction are all annotated with 'via' activation maps.

Expediting Branches

The present invention can speed later execution through a series of branches by establishing the flow of operands to comparison instructions and to the branches which use the results of such comparison. If the instructions producing the operands that are tested for branching are simple and fast, as they often are, then a branch can be executed before many of the instructions that precede it. Slow instructions such as division or a sequence of instructions dependent on prior instructions or instructions waiting on memory latency can be allowed to execute at their leisure while branches quickly execute and activate more flows and more out-of-order instruction executions. Early execution of branch instructions is aided by treating condition codes as another variety of operand that is forwarded from comparison/testing instructions and often from arithmetic instructions to branch instructions.

Branches statistically are encountered as often as every fifth instruction, or even more frequently in some program codes but the present invention avoids performance loss usually associated with program branching by forwarding operands to and around branches and by triggering the start of instructions that follow branches.

Performance of the computer system may often be improved by favoring forwarding of operands (condition codes or registers) to branch instructions and the triggering of those branch instructions. Expediting flows to and execution of branch instructions triggers more instructions that follow the branches and so put more flows and instructions into play sooner while other instructions continue to execute. Such a bias toward branches can result in a larger pool of instructions that are ready to be executed. Even where the average number of instructions ready to be executed exceeds the number of execution pipelines, the backlog of ready but unexecuted instructions can act to smooth out execution throughput in those times when, perhaps due to non-loop branching, few new instructions are being added to the backlog. Operand flow mapping annotates operand flows with indications of priority of flow and triggering of execution as part of the mapping.

Bypassing Operand Store/Restore

Operands are often copied to other storage locations such as when register operands are 'saved' to memory before executing the body of a subroutine where the registers might be changed. Before or just after return from such a subroutine the saved operands will usually be restored to their previous values from the save locations. A similar situation is encountered when compilers or programmers run short of registers to hold temporary values and must temporarily save (register spill) one or more operands in a memory location. It is often the case that the operands actually undergo no change and so need not be restored if they are being indirectly forwarded to other instructions. Mapping methods in embodiments of the present invention detect conditions where restore of an operand is not needed. The annotation of some class of operands (such as registers) is extended to include the last instruction to copy the operand to some other class (such as memory) and the address to which it was copied. When executing in mapping mode, an instruction that copies from a particular class of storage to an operand in another class of storage causes the mapping method to determine whether the (saved) input operand was last updated by the same instruction that last saved the result operand of the present instruction. If the result operand has not been altered since it was copied and the 'restore' operation references the address to which the operand was previously copied then the restore copy instruction can be bypassed (suppressed) since it would have no detectable effect.

If there are no branches intervening between a store and restore operation or all branches lead to the same restore (copy) instruction, then a flow mapping is established so that in subsequent execution of the store (save) instruction a suppression token is sent to the restore instruction to suppress its execution. Suppressing execution of the restore operation will decrease traffic to memory as well as to the register or stack operand store. It would be desirable to suppress the store operation as well but it is more difficult to prove that the saved operand will never be accessed by any instructions after the operand is copied there. The value of suppressing unnecessary operand restores will be less where optimizing compilers detect that operand saving and/or restoring are unnecessary and generate save/restore code only where it is actually needed.

Suppression of restore operations must ensure that exception numbers match before finally suppressing execution of the restore operation so the suppression token that is forwarded from the store operation to the restore instruction must include the exception number or thread number. If, at the time that the restore instruction would be issued (before instruction retirement), the exception or thread numbers do not match, then the suppression token is discarded and the restore operation is executed.

Group Flow Scheduling

When an instruction that takes input operands is executed in mapping mode, it is apparent which instructions generated (last altered) its operands because operands are annotated with the addresses of the instructions that last altered them. A high-performance embodiment of the present invention includes a method for annotating operand sending instructions with information for scheduling later instructions. Aggressive scheduling of dependent instructions can avoid the necessity of storing forwarded operands in temporary memory means, as well as the overhead of their later retrieval from that memory for use in execution, by forwarding operand values directly to pipeline execution units.

If one or more operand flows are independent of all other intervening instruction output operands and the execution path to the target instruction is determined and mapped then all or several of the instructions sending operands to the target instruction are scheduled for execution together. If a computer is designed to support forwarding of operands either between stages of a single pipeline or to cross between execution pipelines (which is known in the art), then the operand-sending and one or more operand-receiving instructions are scheduled to execute together. Where such flow scheduling is done, it avoids storing and retrieving operands between the instructions in the flow.

Figure 9:
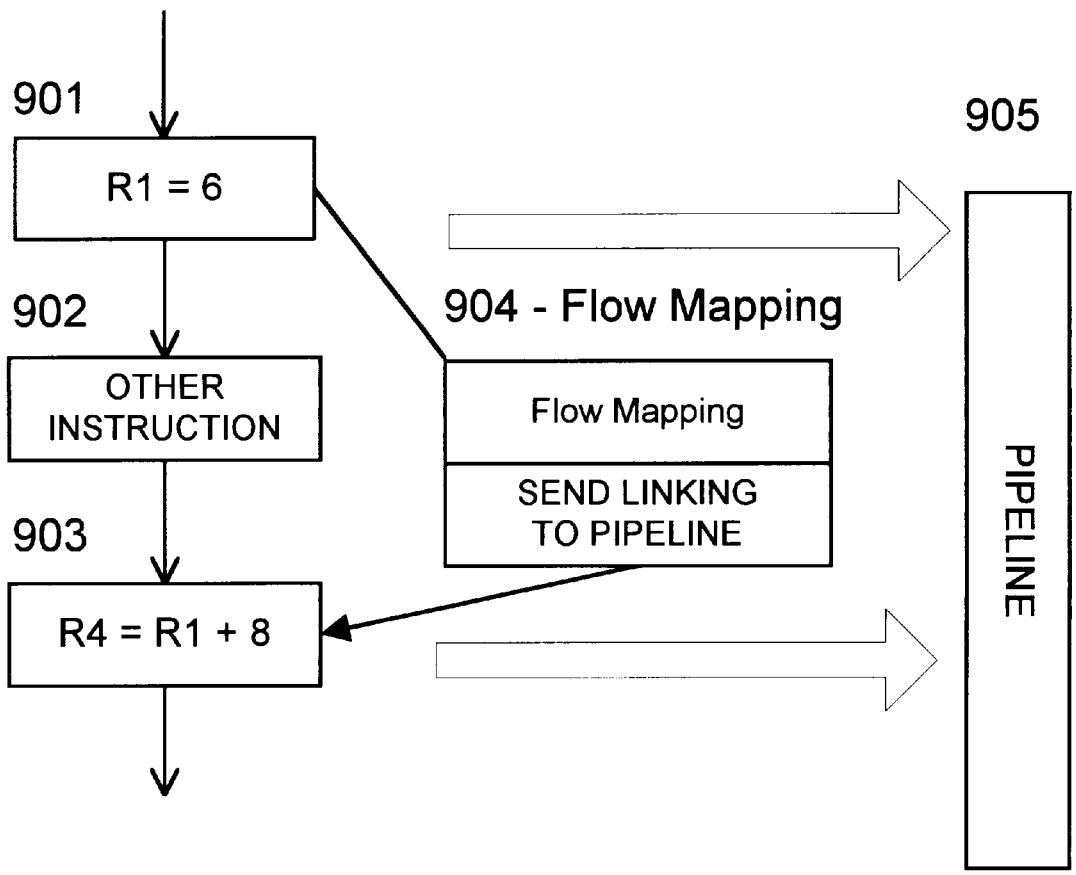
FIG. 9 depicts group flow mapping.

In FIG. 9 an instruction 903 is dependent only on the result operand of instruction 901 and this operand flow has been previously mapped. The mapping of the operand flow from instruction 901 to instruction 903 has taken note that the two instructions can be sent to a single execution pipeline with information to forward the result of instruction 901 to instruction 903 in the pipeline so the operand value need not be stored between its generation in instruction 901 and its use in instruction 903.

Compilers built to produce computer codes that run on computers having the above aggressive scheduling features arrange the computer instructions they produce so that instructions producing operands used by the same target instruction will be close together in normal program flow.

Independent Strings of Execution

The mapping mode of execution attempts to discover all operand dependencies between instructions and to record these dependencies in the flow mappings. Where all dependencies have been mapped, then instructions which are not dependent on each other are independent of each other. The operand flow mappings produced by the mapping method of the present invention define operand dependence between instructions. Control flow, where one instruction precedes another, also defines dependencies between instructions. Instructions that are not dependent on each other's results nor upon the results of instructions dependent on those instructions are independent and can be executed in parallel so long as they are retired in program order.

Some instructions may have no inbound operand flows (e.g. unconditional branches [jump instructions], or instructions with immediate operands). In such cases the mapping method will discover during first execution that an operand flow cannot be mapped and will then map a flow of a special, triggering token from the last branch path to the present instruction. This operation is nearly the same as forwarding the program counter (PC) as an operand. When that branch path is selected in anticipation mode, the triggering token is forwarded to the independent target instruction which will be executed. Early starting of such independent instructions increases the already high number of instructions that can be executed in this highly parallel architecture. Though an independent instruction has no inward flows, it may originate a number of outward flows which will result in yet more parallel instruction execution.

Very Long Instruction Words

In one embodiment of the present invention, strings of dependent and independent instructions are assembled by the mapping method into one or more long instruction 'words' each holding one or more instructions that can be executed together or that can be chained together so that operands are forwarded between stages of an execution pipeline or between separate but connected execution pipelines. The instruction 'words' in that embodiment have sufficient storage space to contain all operand values needed instead of references to containers (registers or addresses) of values. In popular computers of this day, the values would each require 32 or 64 bits or more. The instructions in these 'words' contain the operation codes and modifiers as well as values and location signifiers if a result needs to be stored to a location or flowed to an instruction that is not part of this string of instructions. Also included in the instruction 'words' in the present invention are forwarding directions between pipeline stages or between execution pipelines. This embodiment is similar to very long instruction word (VLIW) architecture machines except that VLIW programs are composed by compiler programs prior to beginning execution while this embodiment composes the instruction words during program execution in mapping mode.

Mapping Through Interrupts and Exceptions

Most computers provide means for interruption of currently running program code. Interruptions can be caused by an event such as the start or completion of an input or output operation, or by a page fault where the currently running program attempts to access a virtual memory location that is not present in main memory, or by an arithmetic error (e.g., divide by zero) in the currently running program, by a timer device sending a signal (that might mean expiration of a time slice for the currently running program) or by other causes. Where feasible, operating system software may attempt to resume executing the currently running program code at the point of interruption after handling the cause of the interruption. However, resumption of an interrupted program code is often deferred by the operating system software while other threads of execution are given their shares of execution time.

The present invention keeps a running count of interrupts in an Exception Number counter (named thusly to distinguish from the interrupt type numbers or interrupt numbers of some computer nomenclatures). At occurrence of each exception, the exception counter is incremented by one. As the exception counter is incremented past the maximum value that it can contain it will acquire a value of zero. Associated with each operand is an exception number which is the value of the exception number counter at the time that operand was last altered. If all operands used by an instruction have the current exception number, then it is certain that program flow was not altered by an intervening interrupt which could cause program code to be executed that would alter operand values. An example of operand alteration is where an arithmetic error exception causes an interrupt and interrupt handling code 'fixes up' an operand so that resumed execution will not encounter the error. Such an operand flow could be confusing to the mapping of operand flows were it not for tracking the exceptions. If not for the exception number, it would not be clear whether or not the intended flow should include the interrupt handling program code or ignore such code.

In simple versions of the present invention, mapping is not carried out across interrupts. If the exception numbers of the input operands do not match the current exception number, then the current instruction is not considered to be the target of any operand flows. This unmapped flow may be mapped at a later time, in a different execution when the source and target instructions are likely to be executed in normal sequence with no interruptions.

Traps and Service Calls

Figure 10:
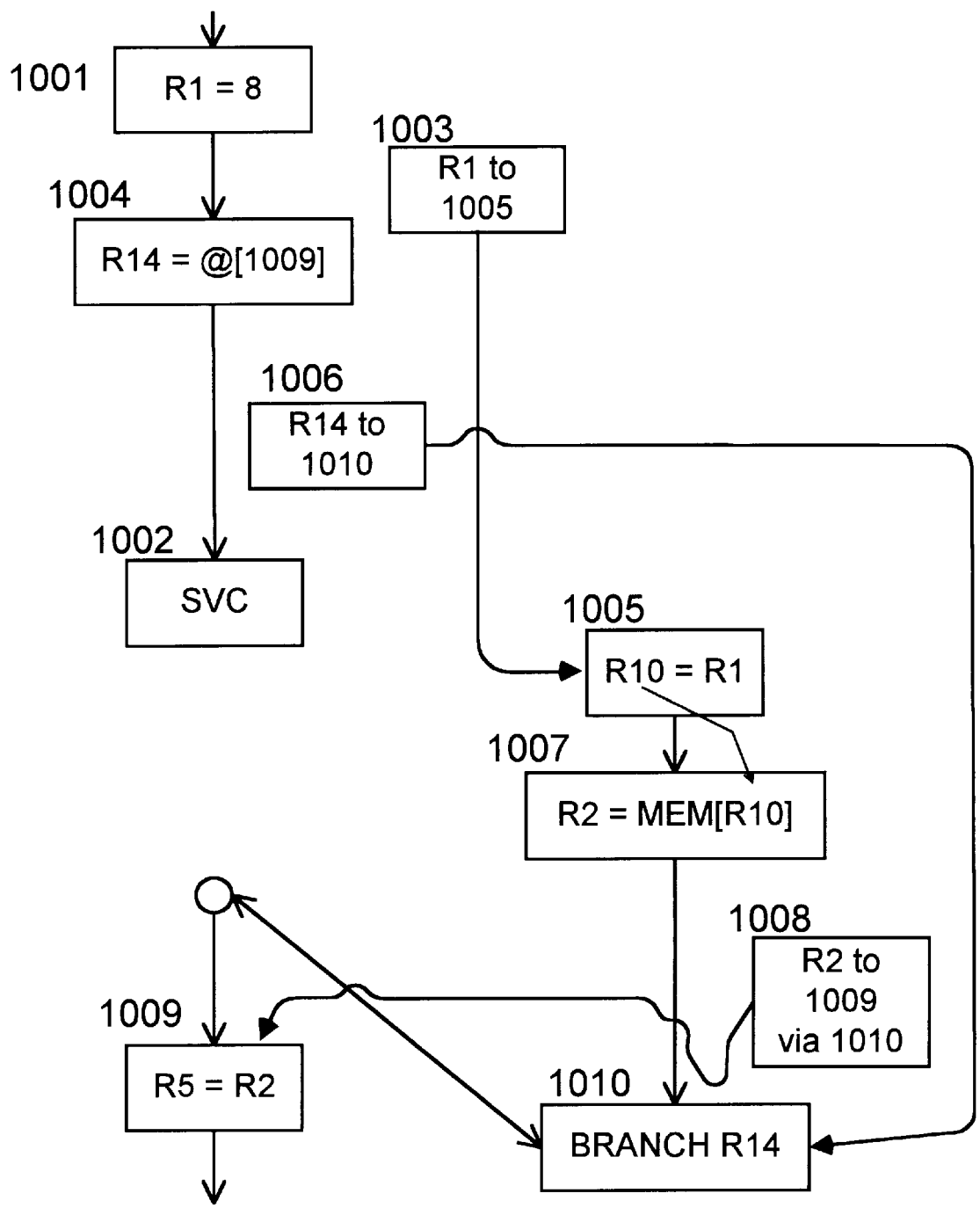
FIG. 10 depicts service calls.
Figure 11:
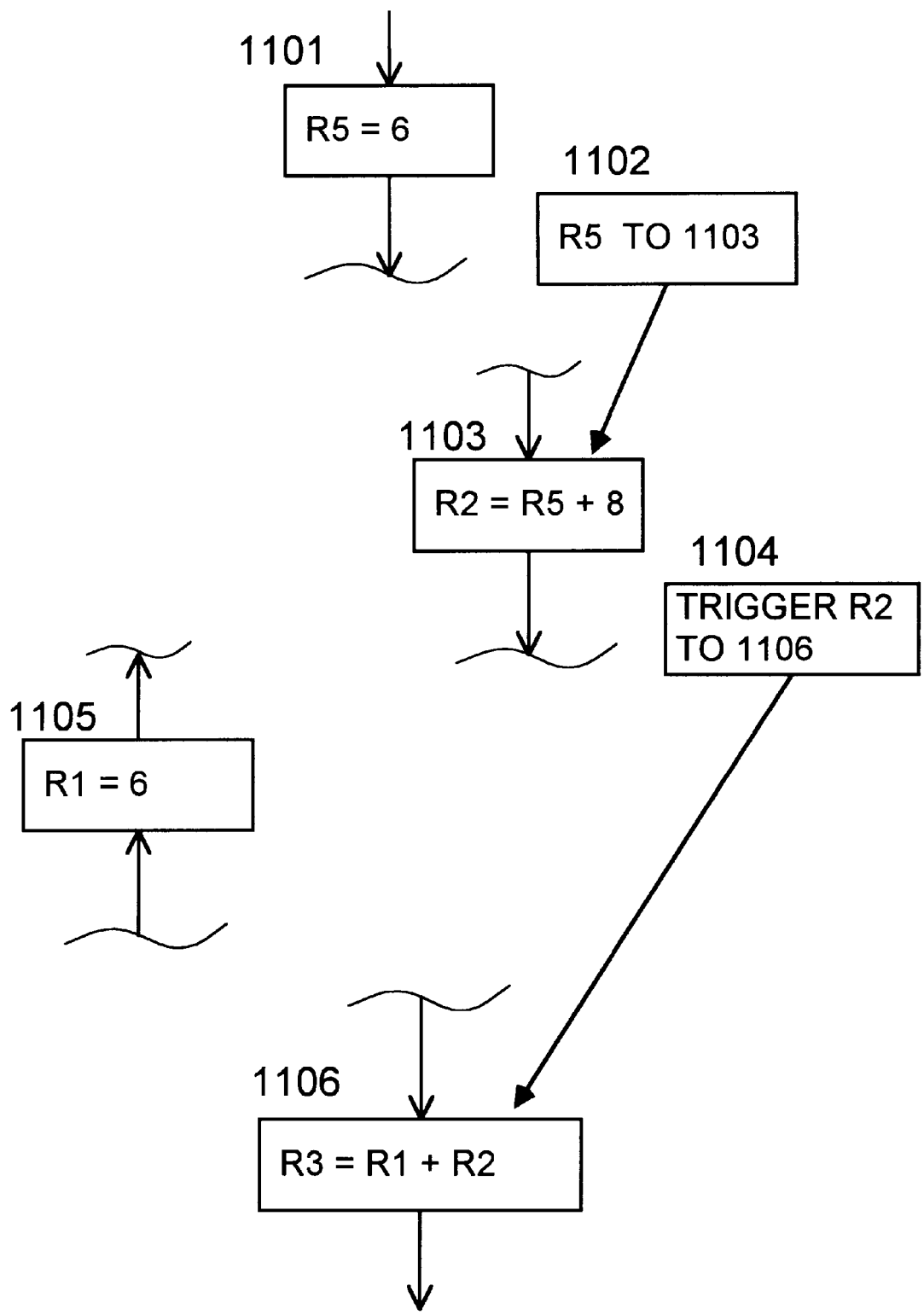
FIG. 11 depicts a triggered but missing operand flow.

In many computer architectures, software-generated interrupts or 'traps' are used to convey requests from application software to operating system or supervisory software. Where these interrupts can be distinguished from other types of interrupts such as I/O completion or arithmetic error, the mapping methods of this invention are applied to treat these service call interrupts as unconditional branches to known instructions. Referring now to FIG. 10, execution of an instruction in an operating system service call handling routine 1005 that uses an operand modified by an application instruction 1001 just prior to the service call interrupt 1002 will cause a flow mapping 1003 to be recorded as showing that operand as flowing from the application instruction 1001 to the operand-using instruction 1005 in the service call handling routine. If the service call subroutine returns to the application program by branching to an instruction address in the application program generated prior to or as part of the service call interrupt handling routine, then the flow 1006 of that return address operand is mapped so that the return branch 1010 can be started before the service call routine finishes depending on branch paths in the service call routine which will be mapped. Operands that are modified in the service routine before returning to the calling program are also be mapped 1008 so that they can be used even before the service routine has ended. Because service and other subroutines may be used by multiple client programs, the mapping of operand flows VIA the subroutine return (or variable branch such as the Branch on Register 14 convention in IBM System/370) must allow for multiple operand flow targets. Such return flow targets cannot be known until later execution in anticipation mode, In many operating systems, when some service calls are executed, the operating system will take that opportunity to dispatch a different thread instead of immediately returning to the thread (and process) that issued the service call. Mapping operand flows through such thread or context switches is safe in most cases since the operating system will nearly always load general registers with the contents of some location and may switch address spaces. The mapping method might map operand flows via a conditional branch where an operating system decides whether or not to switch threads. If the operating system does switch threads, then operands will not flow through the branch path where that decision is made.

Low Overhead for Mapping

Operand flow mapping involves annotating operands and associating flow mappings with sending instructions in addition to normal execution activities but these additional mapping activities need not slow instruction execution. Annotation of operands with the addresses of their last modifying instructions can be accomplished in parallel with instruction execution and so will not slow instruction execution in most computer architectures. Operand modification addresses can be stored simultaneously or substantially simultaneously with storage of new operand values. The association of mapping flows with sending (operand-modifying) instructions can be done in additional pipeline stages of instruction execution or in instruction retirement in more advanced microarchitectures. Operand flow mappings are seldom needed immediately after execution of an operand-receiving instruction and are usually established only once per instruction. Operand mapping will require more components (more circuitry in electronic implementations) but, because it can be done in later pipeline stages, it should not slow execution throughput. Mapping activity is seldom in the critical path to instruction completion.

Instruction Addressing

Some computer systems use a single virtual address space for all processes while others keep a separate space or spaces for each process. Operand flow mappings must be kept in a form that is compatible with the addresability characteristics used for the instructions among which the operands flow. This condition may require that the flows be accessed by and refer to instructions in terms of real memory addresses or that an address space identifier be included in instruction addresses. Those skilled in the art will recognize that the alternative arrangements for addressing in operand flows will depend very closely on the addressing schemes used in the processor being designed. Those skilled in the art will also recognize ways in which storage requirements for operand flow mappings can be reduced by reducing the amount of address information actually stored. The mapping scheme could, for example, use the addressing scheme of the instruction cache if it were desired that only cached instructions be mapped.

Parallel Execution Out of Loops and Mapping Ahead

When executing a loop in mapping mode and the loop has been mapped so that the exit condition and branch are exactly predictable, then the instructions beyond the loop exit can be started in a predictive mapping mode in parallel with execution of the loop so long as those following instructions have no operands being updated by instructions still being executed within the loop (which is known from the mapping of the loop). Operand values generated by the post-loop instructions must be treated as anticipation mode operands which cannot appear in normal program-accessible areas (registers and memory areas) until retirement of the post-loop instructions which must await retirement (or final discard) of the loop operands.

Where the post-loop instructions use operands whose values might be changed in the loop, mapping can continue beyond the loop exit. This form of mapping is more complex than the mapping method disclosed above. An operand that is used by a post-loop instruction might be altered by several different instructions within the loop. In such cases, if it is clear which loop instruction will be the last one before the loop exit to affect the operand, then a mapping can be established via the loop exit (forward branch or fall-through path of loop, back conditional branch). Where an operand is changed by only a single instruction in the loop it is more straightforward to establish a flow mapping via the loop exit to a post-loop instruction that will need the operand value. If operand flow mappings via the loop exit can be established before the loop exit is taken, then when the loop exit is actually taken the operand values can be passed to and trigger the receiving post-loop instructions.

Planning Instruction Retirement

To speed the retirement of instruction results, computer designs can task the mapping method with also planning for the retirement of the instructions being mapped. For retirement planning, the mapping method keeps track of blocks of instructions that can be retired together. Instructions must be retired (and their results copied back to "public" places such as general registers and memory or cache and condition codes in program order even though, after mapping, they will most likely be executed out of order.

The mapping method can note that a basic block of instructions can be retired together (gang retired). That they must be retired in order does not mean that process needs to be continuous or even smooth. It can proceed by jerks and starts so long as other non-mapped instructions or instructions executed after an interrupt do not see out-of-order results.

To enable faster retirements (parallel retirement of multiple instructions), the mapping method creates templates to contain instruction retirement information. In later execution in anticipation mode when a given instruction is triggered and that triggering will guarantee the execution of a bloc of instructions, then the template will be used to create a retirement block in some fast memory. The retirement block will have space for each result to be copied to a public location such as a register or a memory address. The retirement block may also note the locatin type and name (address) of the respective result.

Retirement blocks also each have a countdown field or register so that the retirement mechanism can determine when it has all necessary result operands for that block. Retirement blocks are normally chained together in planned retirement order since each must wait, even if it has all necessary result operands, until all preceding retirement blocks and any intervening unmapped instructions are completed.

Figure 14:
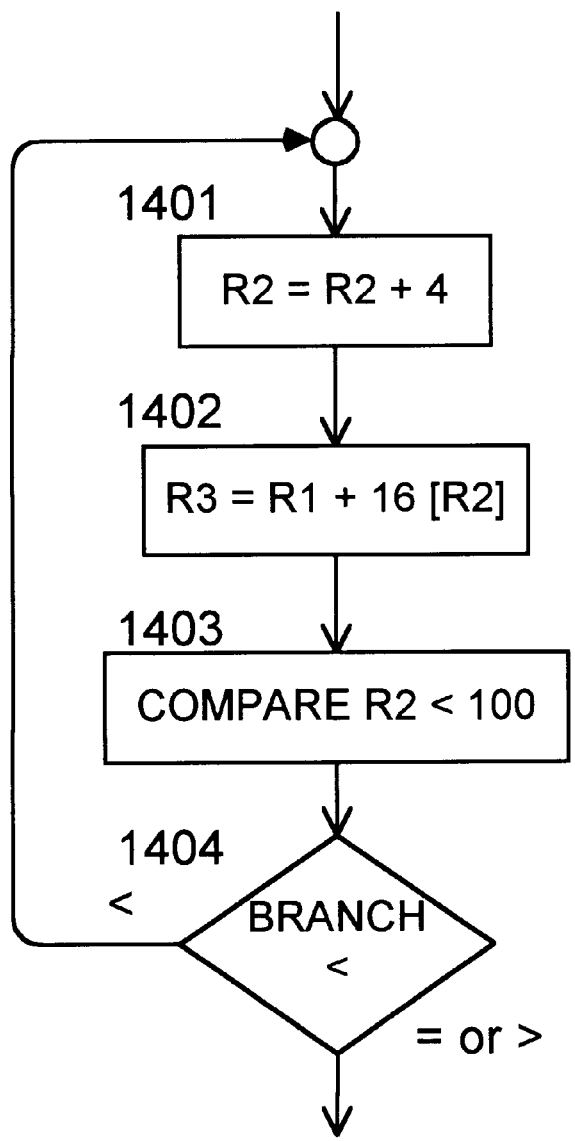
FIG. 14 depicts instruction retirement planning flow.
Figure 14:
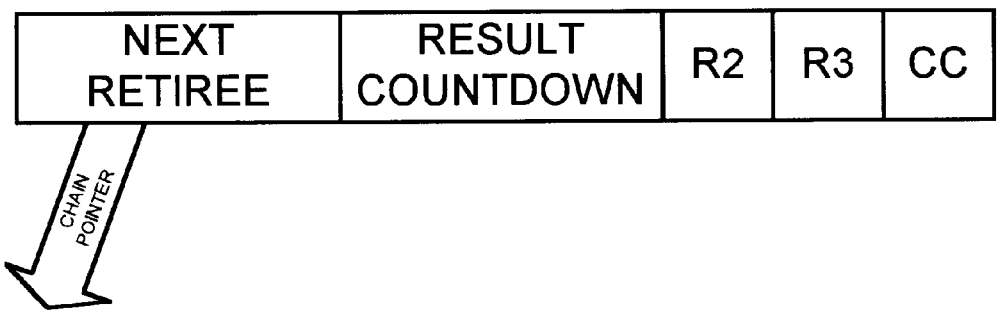

A retirement template 1406 is shown in FIG. 14 with a result countdown field as well as slots for the results of the instructions that have been executed in mapping mode. When any of the mapped instructions are triggered in later anticipation mode execution, a retirement block will be created from the retirement template. The retirement block might be an exact duplicate of its parent retirement templated but a single template could generate many instances of retirement blocks especially when triggering loop executions. Retirement blocks are holder for actual results whereas templates are plans for building the retirement blocks.

After a retirement block has been created and its results have been filled, the retirement method will await commitment of all prior retirement blocks and any intervening, unmapped instructions before committing this block of results.

The retirement blocks can also feature a suppression means. If, within a block, the same public location (reg., address, cc) is named by multiple instructions (write-after-write), then the first result can be suppressed. This can serve to diminish the traffic to the public locations such as the register file and, especially to condition code registers in architectures where many instruction types affect condition codes. In the event of an interrupt, the last uncommitted retirement block might be used to determine what should be made public before honoring the interrupt. Operands that will be written over in the same block would be so marked in the retirement block and will disappear unless that retirement block is caught by an interrupt.

Metacode

As disclosed above, actions to be taken while executing in anticipation mode can be encoded into mapping entries that indicate the flows of operands and triggering among instructions in computer programs. An alternative method disclosed here is for the mapping mechanism to add computer instructions to the instructions being mapped. These meta-instructions are executed in parallel with the operand sending and receiving instructions. Meta instructions in some embodiments have access to resources that are not available to normal program instructions, even privileged instructions. Meta instructions might be able to block operand flows between instructions or block the execution of some instructions. Metacode resembles the microcode found in many computer implementations but meta-instructions differ in that they are generated on-the-fly by execution of computer programs to encode plans for future behavior of the computer. The advantage of metacode over the mapping disclosed above is that metacode, as with computer programs in general, can become arbitrarily complex and perform any actions of which the computer processor is capable.

Metacode is stored, retrieved and activated in a variety of ways. For example, meta-instructions are stored in a memory that is accessed in parallel with the instructions that are in normally addressable memory or in cache. Some implementations include indicators with regular program instructions that can signal that one or more meta-instructions are attached to indicated program instructions. This indicator activates fetching and execution of one or more meta-instructions along with the program instruction. Metacode is used to implement any of the operand forwarding, instruction triggering or even mapping actions disclosed with the present invention. Metacode controls execution pipelines, starting and stopping them and inserting more metacode into execution streams or invoking meta-subroutines. Particular benefit is obtained from using metacode in implementing loop explosion and other actions requiring coordination of many actions and flexible allocations of many resources.

Anticipation Mode

When executing segments of program code which have been previously mapped by execution in mapping mode, instructions are executed in anticipation mode, loop explosion mode or speculation mode.

If a flow has been mapped via an intervening branch path and if that mapped path is taken when the conditional branch executes (in anticipation or loop explosion mode), then operands mapped via that branch path will be forwarded from the sending instructions to the operand-using instructions. Operand forwarding along such flows will cause the receiving instruction to be started if all input operands to those instructions have been forwarded and execution units are then available. Flows are mapped through multiple paths (taken and not taken) of the same branch instruction for those paths that have been mapped by a prior execution in mapping mode.

Reuse and Preventing Stale Operands

There are few temporal relationships that can be relied upon in anticipation mode execution where the purpose is to promote out-of-order execution. Even in execution of tight program loops, the loop iterations can be executed out-of-order though the instructions must be retired in order. One iteration may encounter a cache miss for a storage operand that could delay it for hundreds of machine cycles. If the next loop branch does not depend on that operand, the other iterations will continue executing and branching which is precisely what is desired to maximize parallelism and throughput. The anticipation method triggers more and more instructions instead of waiting for the delay of one or a few instructions. Parallelism will be dramatically increased.

Figure 16:
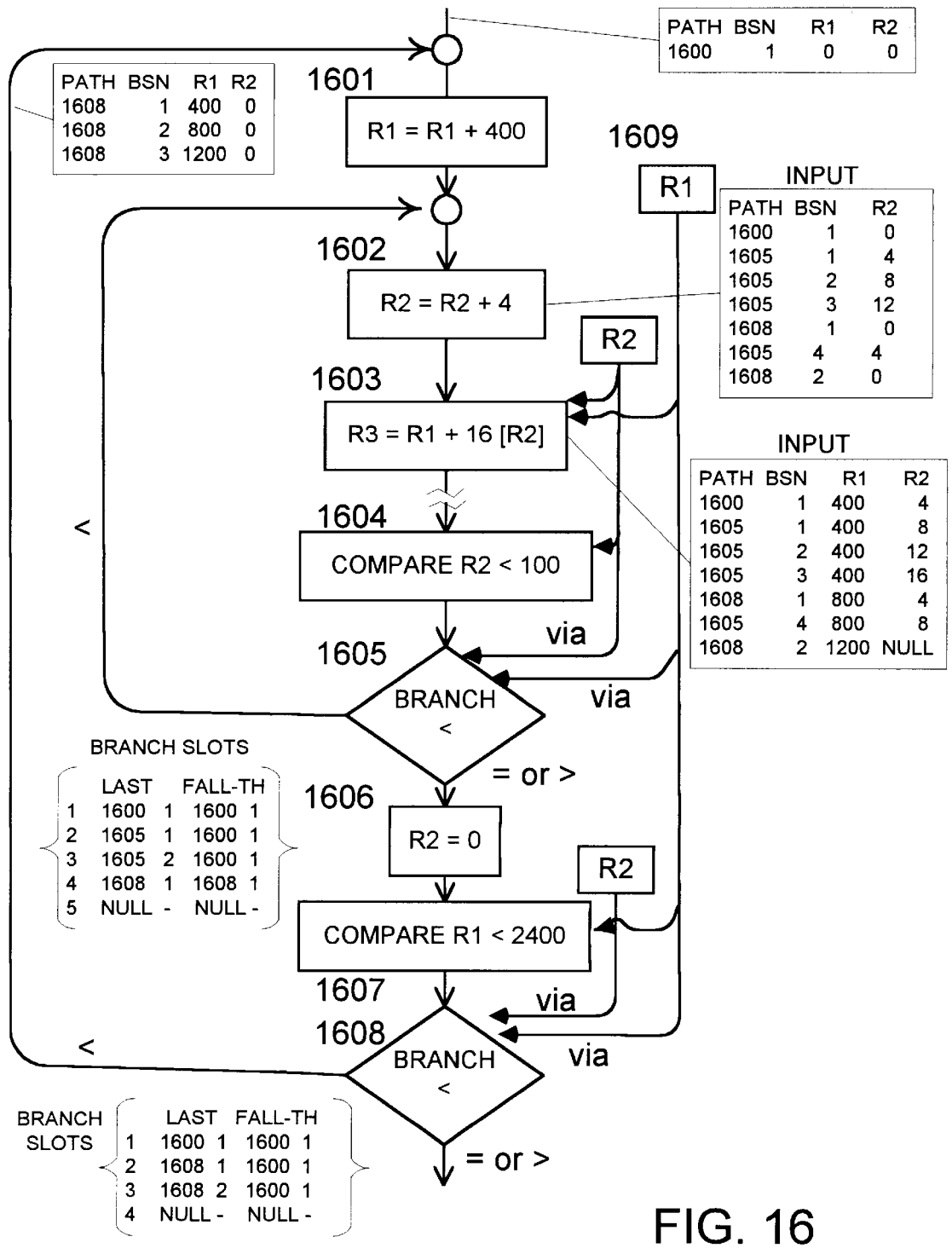
FIG. 16 depicts an operand coherence and matching flow.

In FIG. 16, when executing instruction 1601 in anticipation mode, the value of R1 1609 is immediately forwarded to the compare at instruction 1607 which will forward its (condition code) result to the branch instruction 1607 and the value of R1 will then be forwarded to instruction 1601. Instruction 1601 will be triggered by the flow and will continue. Since instruction 1603 accesses memory, it may encounter significant delays from cache misses. Several non-branching but possibly time-consuming instructions are shown as omitted from the figure between instructions 1603 and 1604. Many iterations of instruction 1601 in the outer loop may occur before a full set of the inner loop instructions has completed. But each execution of 1601 would forward a new value of R1 to instruction 1603 as well as to the inner loop branch 1605. There could be dozens of different instances of the inner loop (instructions 1602–1605) executing concurrently and this is precisely one of the objects of the present invention.

If the result in R1 1609 is directly forwarded to instruction 1603 each time instruction 1601 executed, then a new value of R1 from a new instance of the outer loop would be likely to reach instruction 1603 before the inner loop iterations associated with the first forwarded value of R1 could finish executing. The inner loop would combine values of R1 from the second or third or later executions of 1601 with R2 values intended for the first iteration of the outer loop. The method would then not be carrying out the intent of the executing program and would be incorrect. This would yield incorrect computation results.

A method is needed for combining the correct instances of forwarded operands when executing in anticipation mode. Operands produced and combined within a loop should be from the same loop iteration. Operand values forwarded between loop iterations via a loop backward branch should be combined with appropriate operands in the next loop iteration except where a new value is produced in that next loop iteration (a next loop iteration might use an operand value forwarded from a preceding iteration AND create and use a new value of that same operand as in FIG. 16 where the R2 operand is used by instruction 1602 which also creates a new value for R2). Operands produced outside a loop and forwarded to instructions within a loop must be used in the correct loop iteration. Operands produced before a loop and forwarded beyond the scope of the loop can be directly combined with operands produced after that loop. The method is able to combine operands forwarded from inside a loop (via the fall-through path of a backward branch) with operands produced after the loop or with operands forwarded from before the loop. Operands produced in different iterations of a loop cannot be combined unless some are forwarded VIA a backward loop from the prior loop iteration. Anticipation mode execution can usually only use literal or forwarded operands but not use operands from their architectural locations. The anticipation method will not access register operands from the register file (location of register values generally accessible to sequentially executing programs) nor from main memory or cache locations nor are register results stored into the register file nor into memory locations until the anticipated instruction is retired.

To ensure that target instructions combine the intended instances of forwarded operands, the forwarded operands are labeled or tagged with information that distinguishes the instances. One method for labeling operand instances is shown in FIG. 16. Associated with each backward branch path are some number of branch slot numbers. Branch slot numbers are allocated at the time a branch path is executed (taken) from among the slots available for that branch. This allocation is done whether the backward branch is executed in anticipation mode or in regular (mapping) mode. If no more branch slots are available, then the branch execution and forwarding are delayed until a slot is available though methods for dynamically increasing the number of slots could be designed. Each forwarded operand value instance is labeled with the branch path identity and branch slot number of the 'via' path it is taking through that backward branch. If an operand is forwarded directly from one instruction to another instruction without an intervening backward branch (within a single loop iteration), then the operand is labeled with the path and slot number of the last backward branch preceding the forwarding (operand source) instruction. Operand value instance labels will not be globally unique because there might be multiple forwarding paths for the same operand within the scope of a loop. The input value instance of R2 in FIG. 16 is shown as path 1605, slot number 1 with different values input to instruction 1602 than to instruction 1603 or instruction 1604. There are, in this example, multiple values for the same operand within the same loop instance but these different values occur on different forwarding flows. If designers wish to pool storage for forwarded values then they will need to include the identity of the forwarding path in the accessing (e.g. hashing) of the operand values.

It is assumed in FIG. 16 that the last backward branch prior to instruction 1601 was instruction 1600 which does not appear in the diagram. The operand values shown coming into instructions 1601 and 1602 have R1 and R2 equal to zero. This R1 value is used by the initial execution of instruction 1601 when adding 400 to R1 which result is then forwarded to instructions 1603, 1605, 1607 and 1608. The comparison instruction 1607 then forwards its condition code result to branch 1608. The latter instruction then forwards the R1 operand to instruction 1601 which is thereby triggered. When the inner loop falls through the backward branch 1605 (which will only occur after 25 iterations of the inner loop) then R2 will be zeroed by instruction 1606 and that new value will be forwarded via the same branch path but to instruction 1602. The forwarded values of both R1 and R2 when forwarded via branch 1608 would be labeled with that branch and with the appropriate slot numbers. The last input shown for instruction 1603 has a null value for R2 indicating that at the last time shown in FIG. 16 the value of R2 has not yet been forwarded to instruction 1603 from instruction 1602 but a value has been forwarded for R1 via branch 1608. When the corresponding value for R2 arrives, instruction 1603 can be started.

Operand values shown in input tables are not all present in actual anticipation mode execution. Result values for an instruction must be retained until the instruction execution instance is retired but input values can be discarded as soon as the values have been used in execution. Forwarded operand values shown in tables in FIG. 16 represent an ongoing history of forwardings to illustrate the labeling of forwarded operand values. The direction of branch paths, on the other hand, must be retained until the branch instructions are retired (the retirement mechanism determines which way each branch went). Branch path selections are the results of execution of branch instructions and these path selections are used for forwarding of operand values which might not be generated for some significant period of time after a branch instruction has been executed in anticipation mode.

Fall-through paths of backward branches are labeled with the information from the preceding taken backward branch. The first fall-through path in branch instruction 1605 would be labeled with path 1600 slot 1 which was the one in effect prior to initial execution of instruction 1605. Each time a backward branch is taken, the fall-through path and slot identity are forwarded to the next mapped branch: any branches interspersed between that branch target and the backward branch as well as to the next instance of the backward branch itself. The identity forwarded from a loop back branch to itself includes the identity (e.g. address) and slot number of the forwarding branch instruction as well as the identity and slot number that was in effect prior to the first execution of this looping set: the fall-through identity. The fall-through identity is used to label operand values that are passed via the fall-through path of an instruction instance. It is as if operand labeling were being restored to that obtaining 'before' the loop began execution except that execution in anticipation mode can be very much out of order so that 'before' and 'after' are less descriptive of the processor's behavior.

If, in FIG. 16, the value of R1 were forwarded to an instruction following 1608 then that value of R1 would be labeled with a branch identity of 1600 slot 1, the labeling that was in effect before beginning the loop. This instance of the forwarded value of R1 would be treated as though it did not pertain to the loop from whence its value actually came. The scope of values forwarded out of loops is thus lifted 'above' the loop in which they originate. Such scope lifting is also done for operands that are forwarded via forward branches that branch outside the scope of the loop.

Where the present method of operand instance labeling is used in computer architectures having a Subroutine Call type the subroutine call is similarly to an outer loop. The return-from-subroutine instruction is treated similarly to a loop-branch fall-through-restoring the identities from before the subroutine call.

Figure 15:
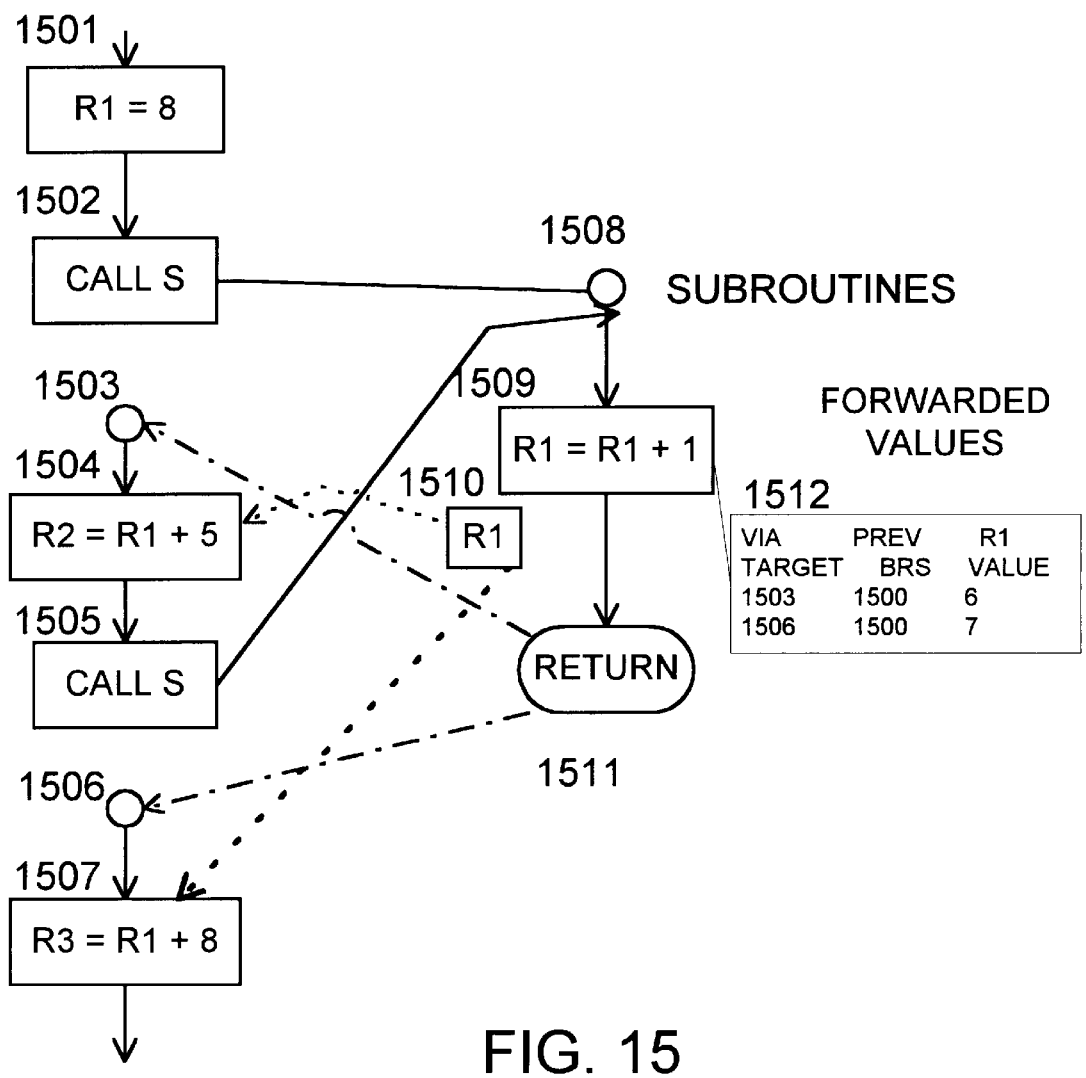
FIG. 15 depicts operand forwarding via subroutine return flow.

FIG. 15 shows that operand values 1510 generated in a subroutine 1508 are returned via the subroutine return target instructions 1503, 1506. Due to the radical out-of-order execution inherent in anticipation mode execution, subroutine calls can be triggered and executed out-of-order. The values returned to different call instances may have different branch slots (BRS in 1512) as well as different values. Values forwarded via the subroutine return target instructions 1503, 1506 are tagged with the branch slot number (BRS) that was in effect for each instance's respective subroutine call instruction 1502, 1505. The same subroutine might be called from many different levels of looping and subroutine nesting or, as shown in FIG. 15, from multiple places in the same block of code. Where a subroutine also includes subroutine calls then the mapped flow will be via the current return target while the BRS value remains the same as for the calling instance. BRS values are only changed by looping back.

Back branches within a loop can have targets outside the scope of the local loop. The safe and expedient design provides the branch with branch slot numbers and label operands forwarded via this latest branch with the back branch's identity and a slot number.

When the method described here is used to disambiguate instances of forwarded operands then, even when executing in mapping mode, operands are labeled with the last backward branch so as not to confuse their values with those of instances of the same operands in subsequent iterations.

Iterations following initial execution of a loop in mapping mode thus take advantage of the mapping to increase parallelism.

BRS: Branch Result Slots—recording branch directions

While it is necessary to retain the directions taken by branch instructions executed in anticipation mode, it is not necessary to retain the fall-through information for instances of branches that will be taken where it is known that those instances will not fall through. It is also necessary to retain information on the path leading to each instance of branch instructions executed in anticipation mode. This retention can be done by retaining the path and slot number of the preceding branch in the manner described in the section above for labeling of forwarded operand value instances. The prior back branch and slot number information is used by the retirement mechanism to select the correct instance of each branch. Threading through instances of branch instructions, retirement can select for each branch the unretired slot identifying the last back branch that was retired. This operation is performed, for example, using some form of associative memory to select branch slots having particular values in the prior back branch identity fields but only a small number of slots need to be searched since only a few instances of any given branch should be outstanding at any time. Thus any given branch needs only a few slots.

Operand Forwarding Storage in Execution Units

Storage is designed into instruction execution units and, if execution units are available in sufficient numbers, then all forwarded operands are stored in execution units while the instructions are being executed. In practical designs, some other storage is provided for queuing flows of operands (in singles, doubles, etc.). Flow storage need only be preserved until the values have been forwarded to their flow target instructions even though result storage must persist until instruction retirement.

Input operand values are combined with the instruction details in some embodiments to form an instruction activation record which is a direct input to an execution unit. Such activation records are stored in queues to await action by execution units.

Handling Interrupts

Figure 12:
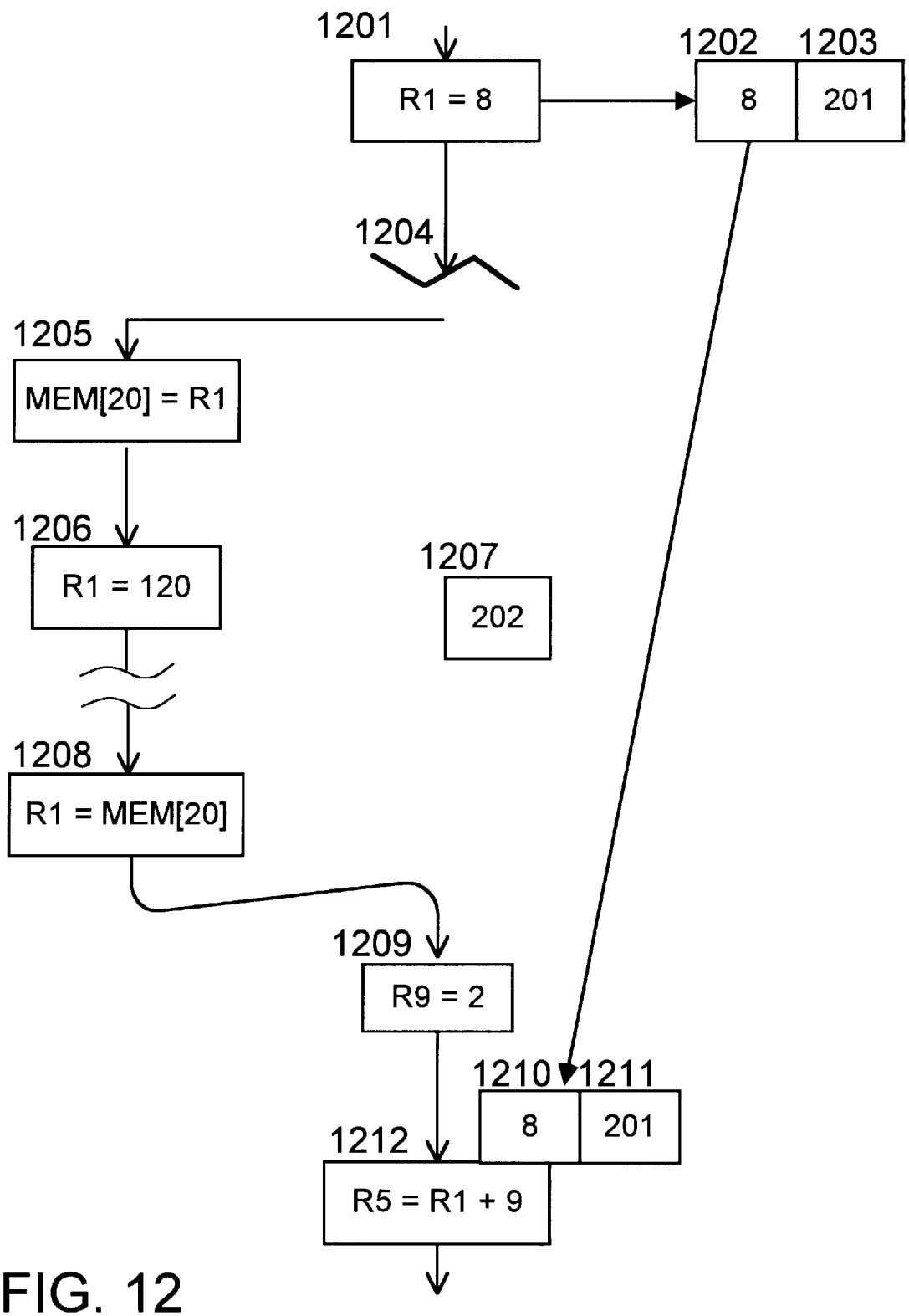
FIG. 12 depicts an interrupt flow.

In a simple embodiment of the present invention, interrupts other than service calls cause abandonment of all results from uncommitted instructions. In this simple embodiment, the results of all instructions that have executed but whose results have not yet been materialized in the architected locations (e.g., register file, software-accessible memory locations, stack positions) are abandoned. For efficiency reasons, designs using the present invention can defer recognition of some classes of interrupts while committing the results of some instructions. Interrupt deferral is discussed further below under instruction retirement. In this simpler embodiment, all forwarded operands are discarded at the time an interrupt is recognized. This discarding is done gradually after the interrupt as the target instructions are accessed for execution or for forwarding. At those times, the execution or forwarding means will notice the association of a forwarded operand with a subject instruction and that the exception number of that operand is not the same as the processor's current exception number. Referring now to FIG. 12, execution of an instruction 1201 has caused forwarding of an operand 1202 and exception number 1203 to the input 1210 and 1211 of a target instruction 1212. An interrupt 1204 that occurs after instruction 1201 but before retirement of instruction 1212 causes a transfer of control (jump) to an interrupt handling routine 1205–1208. The interrupt increments the exception counter 1207. If execution of instruction 1212 was started, then it is abandoned. Depiction of the interrupt service routine in FIG. 12 is simplified to show an instruction 1205 that saves the value of the R1 operand into a memory location before it is altered by instruction 1206. The R1 operand is then restored to its previous value by instruction 1208 before the interrupt routine returns to the application program at instruction 1209. When instruction 1212 is executed the exception number 1211 of the forwarded operand 1210 is noted to be different than the current exception counter 1207. The storage space currently used by the forwarded operand is freed for other use. This abandonment policy means that when execution of a just interrupted thread is later resumed, its efficiency will be less than if it had not been interrupted because it will briefly lose much of the parallelism of forwarded operands and forward execution of triggered instructions.

Figure 13:
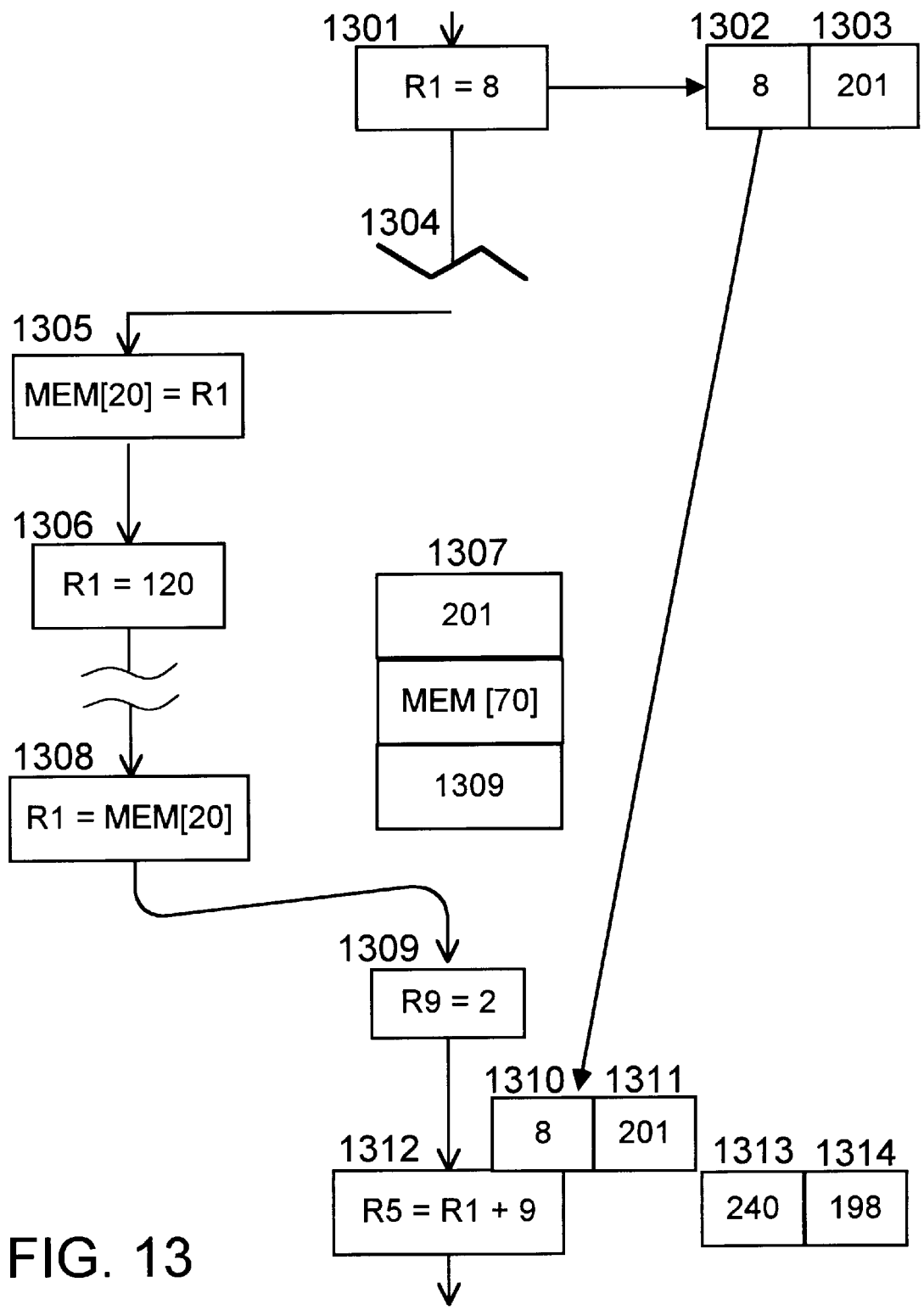
FIG. 13 depicts threads and interrupts flow.

In a more sophisticated embodiment of the present invention, each forwarded operand is marked with the thread number that is current at the time of execution of the instruction that modified that operand. In anticipation mode based on threads depicted in FIG. 13, the thread number of a forwarded operand 1311 is compared with the current thread number in the processor 1307. An operand is not used if its thread number does not match the current processor thread number 1307 but some number of forwarded operands can be associated with an input slot of an instruction. From among a number of instances of a forwarded operand an instruction can use the one operand for a particular operand slot that matches the current thread number. This operation allows continued parallelism where several threads are making way through the same areas of program code because the processor will have associated a saved set of operands with a thread and an interrupt address. With the restoration of that operand set from the same saved memory location and resumption of execution at the same interrupted address, the processor will restore the thread number to the thread being resumed. Operands forwarded for abandoned threads are discarded as an instruction is executed and its input operands are checked against a list of live threads.

In this thread-labeled method of operand management, instructions that were started for the interrupted thread are completed, where this is possible without causing another interrupt, and their results, along with the results of other executed but unretired instructions of the interrupted thread are held in a pool of result operands that are all annotated with their thread number labels. These results cannot be materialized in program-visible locations (e.g., architected registers, memory locations, condition codes) unless and until the operating system software resumes the interrupted thread. Their results are forwarded to instructions indicated by operand flow maps and trigger operand flows will cause the start of target instructions if execution units of the needed type (e.g., integer add-subtract, floating multiply) are available and if all needed operands were forwarded and are ready. Instructions of a suspended thread will not be started if those instructions need to get operands from architected sources (e.g., register file) which might be polluted by concurrent execution of operating system instructions or instructions from other threads. If the result retirement pool is not sizable, a method for discarding unretired results of suspended threads can be used to make room for the current thread to execute efficiently. Any unretired instructions of a suspended thread can be discarded without concern for consistency of results. When the suspended thread is resumed, the instruction issue mechanism advances the program counter as it executes instructions from the resumed thread. An instruction that is not being executed and is not in the retirement pool but is next to be executed in program sequence will be issued.

Referring again to FIG. 13, execution of instruction 1301 causes operand 1302 to be forwarded to the input slot 1310 of instruction 1312 along with a copy of the current exception number 1311. A subsequent interrupt 1304 causes transfer of control (hardware directed jump) to an interrupt processing routine (a simplified version of which is shown starting at instruction 1305). The operand R1 is saved by instruction 1305, changed by instruction 1306 and possibly other instructions in the interrupt processing routine or in other threads but then R1 is restored by instruction 1308 before resuming thread number 201. Restoration of the R1 operand and branching to the resumption point 1309 of thread 201 is detected and the thread number 1307 is restored to its prior value of 201 for this thread. Triggered instruction 1312 will have finished execution or be executing and can be retired after instruction 1309 is retired. Instruction instances from multiple threads can be executing in parallel.

Two instances of the same instruction, at the same address can be simultaneously executing in two different threads of execution. This parallelism requires that the computer design arrange storage for multiple input and result operand instances segregated by thread. In one embodiment, the branch slots explained above are annotated with thread information.

Page Faults in Anticipation Mode

To preserve the semantics of execution of instructions, anticipation mode is not allowed to cause exception interrupts. If, for example, an instruction executing in anticipation mode would cause a 'division by zero' exception, then the anticipation mode execution is suppressed and results are so marked. Later in-order execution of the same instruction will raise an exception interrupt if that is called for. One benefit of executing in anticipation mode is that instructions triggered by data flows are executed out-of-order so that their results are ready before they are needed. In a simple embodiment of the present invention, such out-of-order executions are not allowed to cause page faults. If a virtual memory location holding an instruction or a memory location referenced by an out-of-order execution is not present in real memory and would cause a page fault then, in a simpler embodiment, triggered execution of the instruction is suppressed. If the program's later execution actually arrives at this same instruction, then it will be executed in mapping mode. It may happen during the resulting in-sequence (non-anticipation) execution that some instruction between the operand-sending/triggering instruction and the suppressed instruction will cause a page fault. Unless the mapping method can guarantee a correct alternate treatment of page faults, then they are made sensible in an in-sequence execution order by the first instruction that experiences the fault. Likewise for arithmetic and other exceptions, out-of-order instructions are not permitted to cause a recognized interrupt.

A more sophisticated embodiment of this invention incorporates operating system software that handles out-of-order page faults and schedule page-in operations asynchronously to continued program execution through in one embodiment a separate paging processor or by using another processor that is connected to the same common memory. In such an embodiment, the operating system software inhibits interrupts on most of the processors in a multiprocessor computer and allows one or a few of the processors to handle most interrupts. Thus a needed page can be retrieved from secondary storage by a sibling processor without interrupting the processor which is about to cause a page fault that would halt program execution while the page is retrieved.

Memories: Storage of Mappings, Forwarded Operands and Results

Those skilled in the art will realize that there are a number of alternative ways to store operand mappings associated with program instructions. For example, mappings are stored in cache memories together with the instructions with which they are associated. Another alternative is to store operand mappings in a separate fast memory accessed in parallel with instruction cache(s). In this latter alternative, the operand mapping memory store is accessed using a hash function of the instruction address. This operation allows a differing density of memory usage than is needed for instructions. This serves to smooth out storage needs for cases where an instruction result flows to a large number of other instructions. A variation of these two schemes for storing flow mappings uses a linked list in conjunction with pointers from instructions as in FIG. 8(a) or from hashed instruction header entries as in FIG. 8(b).

In FIG. 8(a) instruction storage is augmented with a link field which will be null (--) when there are no flows from that instruction but will point to the first (or only) operand flow map if mapping has established that other instructions use the result operand of this instruction. Instruction 801 in the drawing forwards its result to instructions 802 and 803. Link 804 points to the first of these mappings 807 which links to the second mapping 808.

Hashed mapping storage is illustrated in FIG. 8(b) for the same program segment as in FIG. 8(a). The first mapping for instruction 821 is stored in mapping 826 which is accessed in parallel with instruction 821 via some form of hardware hashing (e.g. folding middle bits). Most implementations using this scheme would include tag information to distinguish among hashing collisions (not shown). Mapping 826 for instruction 821 links to mapping 827 which can be seen to be the last mapping for this instruction because its link field is null.

Once established, operand flow mappings are valid so long as the program storage is not modified and are useful so long as the program code is in use. Computer designers practicing this invention can arrange for retention of operand flow mappings beyond the times when the associated instructions are in cache(s). This retention is done in one embodiment by employing a mapping storage that holds more entries than the instruction cache or by providing additional, slower storage to hold flow mappings when they are not in current use.

In computer systems where multiple processing units share one or more memories in common, it is possible to transfer the operand flow mappings for a thread from one processor to another processor through means for detecting when a thread of execution has switched from one processor to another. Flushing means are provided for flushing flow mappings from a processor to a commonly accessible memory (for example, some level of cache memory in some designs).

Speculation Mode

Execution in speculation mode is more aggressive than in anticipation mode. Speculative execution in the prior art relies on guessing the direction of branch instructions will take whereas in the SPECULATION MODE of the present invention, branch instructions' directions are only guessed when operand forwarding has not made clear the direction of a branch. Speculation mode here benefits from an enhanced version of the mapping method to track the behavior of each mapped branch. The mapping method attempts to distinguish whether a branch is an exception condition or a loop back branch by tracking its history. Designers using speculation mode in the present invention would be likely to store an abbreviated branching history with the mapping for branch instructions. Speculation mode can in most cases start execution of instructions earlier than with just anticipation mode so it should be able to achieve higher degrees of parallelism at the cost of more complexity and more circuitry.

Implementation of speculation mode will in most designs have much in common with anticipation mode. It will include most or all the mechanisms employed in designs that implement just anticipation mode.

Loop Explosion Mode

When instructions are executed in mapping mode, backward branches (to lower instruction addresses than the branch instruction) are noted. If the same backward branch instruction is again encountered before any other branching instructions then a loop is being executed. If that branch depends on an operand (loop limit) that is being incremented or decremented in the loop by another operand which is not altered in the loop (a loop invariant or an immediate operand) then the number of iterations for the loop are determined by the starting value, the increment or decrement value and the comparison test for the loop branch. When execution is found to be in such a simple loop, instructions in the loop that use operands that are incremented, decremented, multiplied or divided by loop invariant operands (including immediate operands) are annotated during mapping mode as being the target of loop explosion flows. In later execution, in loop explosion mode, instructions that generate loop explosion flows are replaced by one or more invocations of one or more loop explosion mechanisms. The starting value, increment/decrement/multiplier/divisor amount, the target instruction address and the number of iterations required are input to the loop exploder. The loop exploder calculates a loop variable for all requested iterations simultaneously and creates operand flows for each of those iterations. Because loop exploder mechanisms can only explode some limited number of instances of an operand, several filings of the exploder will be needed for some loops with larger numbers of iterations. Loop-exploded operands that are forwarded to other target instructions can make their target instruction-loop instances eligible to be executed. Loop exploded operands are tagged with branch slot numbers computed by the loop exploder mechanism. If there are sufficient execution units available then all the instances will start simultaneously or nearly simultaneously. Excess triggering flows will cause the instruction instances to be placed into a pool of instructions that are awaiting execution.

Figure 18:
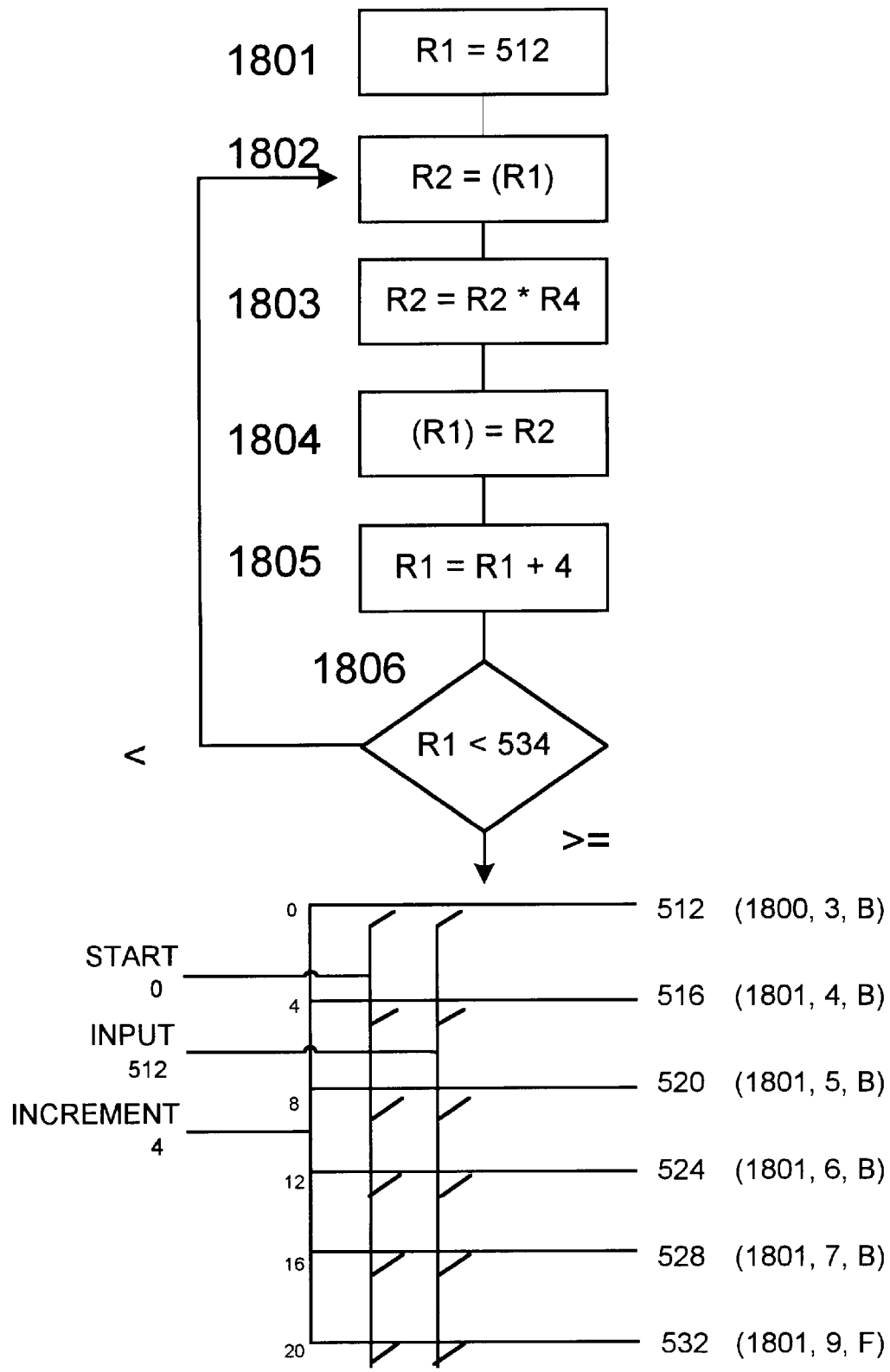
FIG. 18 depicts a loop exploder flow.

In FIG. 18, instructions 1805 and 1806 are executed by the loop exploder mechanism (after mapping) and results are forwarded to instructions 1802 (a load instruction) and 1804. Six instances of instruction 1802 will be triggered nearly simultaneously and, if six execution pipelines are then available those six instances will begin executing in parallel. They will forward their results to six instances of instruction 1803 which will multiply each loaded value by whatever is in R4. The results from six instances of instruction 1803 will trigger six instances of instruction 1804 which will store six results in six different memory locations (indexed by R1). FIG. 18 assumes that R4 has been previously set to some desired multiplier.

The loop exploder mechanism must allocate six available branch slot numbers for instruction 1806. Each result from the loop exploder will include a branch slot number and a prior branch path so that after the loop exploder has carried out the six instructions it will appear that instruction 1806 has executed six times in anticipation mode. The fall-through path need not be carried through iterations as it would need to be in anticipation mode since the mapping for loop explosion will have determined the number of iterations and will map the fall-through case. Execution in mapping mode should have constructed sufficient branch result slots for gang execution at least as wide as the loop exploder or the number of iterations required for the loop. A loop exploder can be used with only part of its width by using a limit parameter to limit its operation to only a specified number of instances (not shown in the drawing). The mapping method can also map multiple firings of the loop exploder to cover cases where there are more loop instances than the width (number of iterations capability) of the exploder.

Instruction Issue

An instruction issuing mechanism in computer processor designs embodying methods of the present invention serves to start the execution (issue) of instructions that have not been executed in anticipation, loop explosion or speculation mode. The Issue Mechanism operates slightly ahead of the instruction retirement mechanism so that results will normally be available prior to being needed for instruction retirement. The issue mechanism proceeds by examining the results for each instruction instance. The instruction issuing mechanism also arranges groups of instruction results (trace-strings) for gang-retirement (group commit). This operation then has the effect of operating like VLIW. Such a process can fill in a larger data structure for a whole trace or large segment of one.

Instruction Retirement

Instruction retirement is in program order. Since there are many instances of instruction results waiting to be retired, the retirement method is able to distinguish the instance or instances of results belonging to the instruction or instructions being retired at a given time. To aid in this disambiguation, results of instructions previously executed in anticipation mode, or loop explosion mode or in speculation mode are held in storage means associated with the instructions that generated their values and are annotated with the path identity (for example, abbreviated branch address and branch slot number) of the immediately prior taken backward conditional branch.

Figure 17:
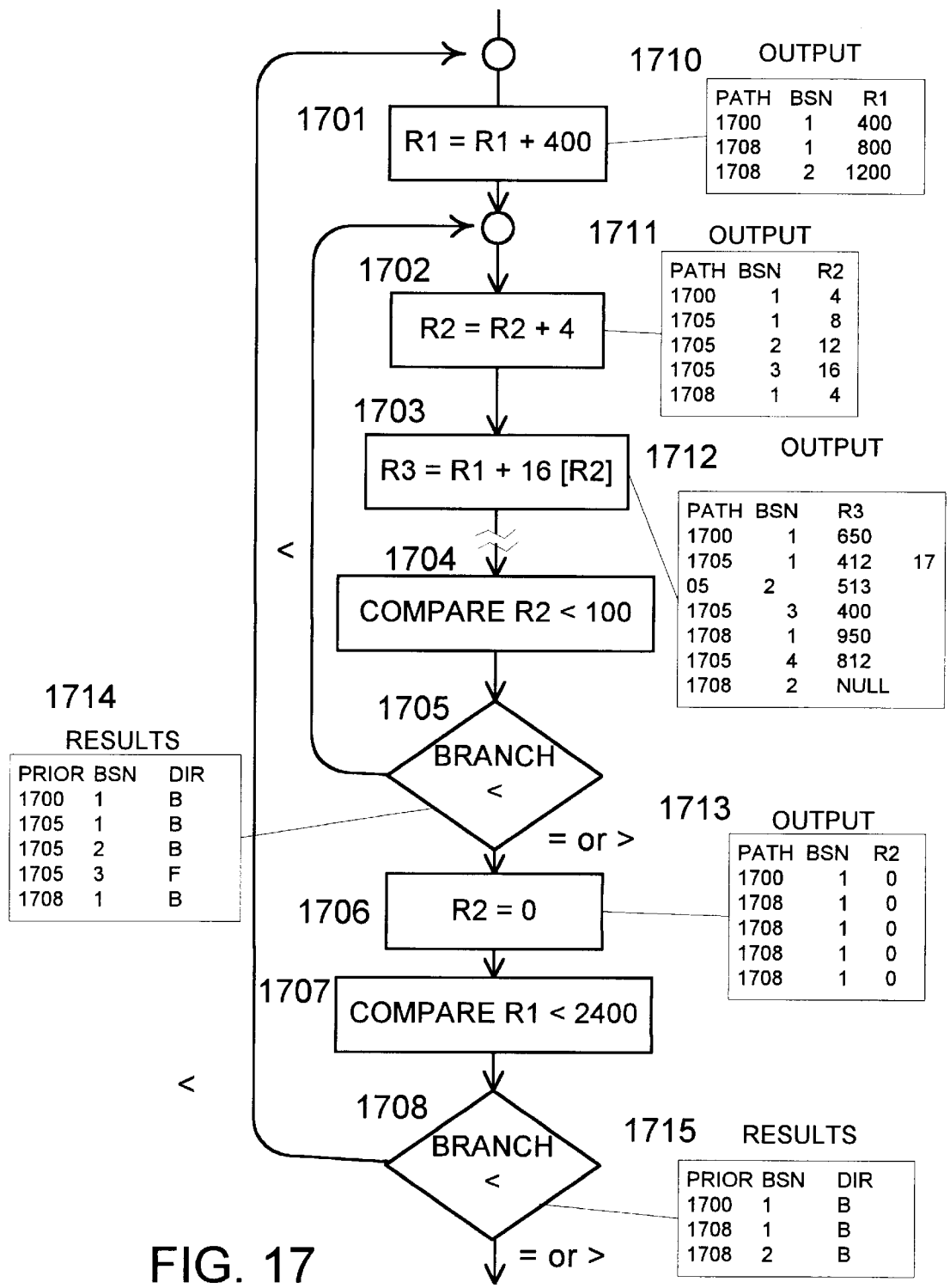
FIG. 17 depicts an operand tagging flow.

FIG. 17 shows the accumulation of results of the execution of instructions in anticipation mode. Output 1710 of instruction 1701 is tagged with conditional branch 1700 (which precedes 1701 but is not shown in the drawing) and with branch 1708. When retiring the first instance of instruction 1701's results, the retirement method retrieves and uses the results tagged with branch 1700 slot 1 as this was the prior taken backward branch. After following branch 1708 backward to instruction 1701, the retirement method uses results tagged with branch 1708 slot 1. In following the next iteration of the outer loop, the retirement method requires a result tagged with branch 1708 slot 2.

The processing of instruction 1705 first looks for a branch slot that was tagged with a prior branch of 1700 slot 1. Since the result with that tag indicates a backward branch, the retirement method follows the branch back to instruction 1702 (the backward target explicit from branch instruction 1705). On the next retirement iteration through instruction 1705, result tag 1705 slot 1 is sought and followed backward again. Since this result was found in slot 2 of instruction 1705, then this value will be the identifier used for all results in retiring instructions 1702–1704 and in selecting the next result in instruction 1705's results 1714.

In retiring instructions exceptions caused by those instructions such as arithmetic, overflow and addressing faults, must be recognized immediately. Interrupts caused by asynchronous events such as completion of a disk operation or arrival of a network packet, on the other hand, may allow some leeway in how quickly the current instruction stream must be stopped. The retirement mechanism is crafted so that it will not lose interrupts due to tardiness in recognizing them but there are advantages to deferring pending interrupts until as many completed instructions as possible can be retired since instructions that are not retired will usually need to be reissued and executed again.

Finding and Marking Dead Operands

Excess traffic to and from storage means (main memory, cache memory, register file, stack) is a problem in prior art computer designs. When constructing operand flow maps, the method of the present invention detects when operands are reused. Whenever, in mapping mode, an operand is modified by an instruction, then the previous value of that operand is unreachable and can be discarded. If an instruction modifies an operand and a subsequent instruction modifies the same operand and there are no intervening conditional branches, then when the operand is modified by the results of the subsequent instruction, the value from the first modifying instruction can be discarded and does not need to be stored. Where operand flows are fully mapped and the instruction path is clear, the operand value is discarded without storing its previous value at the time the second modifying instruction is retired. Prior to that time, an interrupt can occur and the operand value might be needed for copying by the operating system to a 'save area'. Prior to retirement, it is possible for the second operand-modifying instruction to execute in anticipation mode before all instructions that use results of the first operand modifying instruction. Such discarding alleviates traffic both to and from the various storage means.

Result Undo File

A further decrease in traffic to result locations (registers, stack locations, memory addresses, condition codes) can be obtained by providing a temporary result cache. Where the mapping method determines that a result will soon be overwritten with a new value, it can place that temporary value into the temporary cache. If all goes as planned by the mapping method, the temporary result entry will not be used and the eventual longer term value will be placed into the public, architected location. If, on the other hand, an exception or interrupt occurs before the newer value can e committed (instruction retirement), the value in the temporary cache becomes the architected result, thus preserving the appearance of precise interrupts even in the face of unexpected interrupts.

Special Compilers

Computer processors using the present methods can be designed to compatibly execute programs built for existing computer architectures and when this is done, no special compiler software is required. Special compilers can, however, improve performance of newly compiled programs through several methods. Compilers for prior art computer processors tend to produce code that will use as many of the architected registers as possible to hold temporary or intermediate values. They usually avoid emitting code that would store temporary/intermediate values in memory locations since registers are generally much faster than memory- even cache memory. Compilers producing executable code intended primarily for execution on machines embodying the methods of the present architecture can make use of memory storage for temporary operands with less regard for the slowness of memory. After mapping of operand flows (possibly subject to alignment restrictions) memory locations for temporary operands are not actually accessed if the machine maps and flows memory-resident operands as disclosed with this invention.

A compiler producing code for the microarchitecture of the present invention can provide a performance advantage by introducing operand killing instructions to overlay a temporary operand after its last use.

| I1 | R1 = R5 + 11 | |
|---|---|---|
| I2 | R3 = R1 + R4 | //Last use of R1 result |
| I3 | R1 = 0 | //Give R1 fake value |

In the code fragment just above, the compiler introduces an instruction I3 to give R1 a new value. This allows the mapping method of the present invention to determine that I2 is the last use of the R1 result from instruction I1 so that value need not be materialized after instruction I2 has been retired. This can result in a decrease in traffic to the architected operand locations (e.g. the register file). The same scheme also helps in decreasing traffic to memory resident operands.

In compilers producing code for prior art machines having large numbers of registers, it is common for the compiled code to unroll loops—to perform the tasks of several loop iterations in each actual iteration. Compilers optimize to machines embodying the present invention avoid loop unrolling because it obscures the intended flow of operands between instructions and can cause extra traffic to architected registers. Reusing the same temporary operands in each shorter iteration of a loop will kill the propagation of those operands: the mapping method will detect that a forwarded operand is being replaced with a new value and that the old value could not possibly be forwarded elsewhere (if there are no conditional branches out of the loop scope) so the old value need not be placed into its architected location. If a register is reused for a temporary operand inside a loop and the loop is iterated 100 times then 100 updates of the register file can be avoided.

In compiling code for computers employing the present invention, it is advantageous to rearrange some loops that are data dependent, having forward branches out of the loop, into two separate loops. If, for example, a loop is constructed to copy one string of characters into another string and to stop copying when a null character is encountered then the copying loop would probably have a test for null and a forward branch out of the loop (or return from subroutine) inside the copying loop. This forward branch would preclude use of loop explosion. If the compiler constructed a first loop to count the number of characters before the terminating null character and a subsequent loop to actually copy the characters, then loop explosion can be employed in the second (copy) loop. The compiled code for the first loop might examine all the characters in an array of limited size to take advantage of loop explosion mode.

Compilers designed to prior art processor implementations will often intersperse unrelated instructions between those instructions that generate an intermediate result and those that use these values. This is done to allow time for the intermediate result to become available. Such delaying tactics are of much less utility where a program will be mostly executed (due to looping and program reuse) in the anticipation mode of the present invention and results will flow along mapped data paths between instructions as soon as they become available.

Compiler-Based Mapping

Designers of computer processors embodying the methods of the present invention may choose to include a feature whereby an operand flow mapping can be included from a computer file so that developers of compiler software can create mapping files. Such compiled mappings provide a performance advantage since the mapping method does not have to wait for a first execution of a body of code to determine the flows of operands among instructions. Use of a compiled operand flow mapcan could be done with methods similar to those used for symbol files used in program debuggers.

In computer processors incorporating the metacode feature disclosed above, the compiler can be allowed to generate metacode instructions to be associated with certain instructions. One advantageous meta instruction is a Kill Operand operation that signals the underlying processor that, if this meta instruction reaches the retirement unit, then a named operand is not to be materialized in its architectural location. Before execution of this meta instruction, an exception or interrupt might occur which would require production of that operand so it must be retained until the kill operation. Such operations can also be generated by the processor without compiler assistance but the compiler often has a wider view. A compiler can, in many cases, tell that an operand value will never be reused while the computer processor-based mapping method might not be able to rule out further use of an operand value in some subsequently executed but unmapped instructions.

Large Machines

Mapping and anticipation mechanisms can realistically be implemented as other chips or boards. Boundary crossings are not very important because there is little interaction except to keep issue mechanisms from issuing an instruction that is already executing in anticipation mode and to keep anticipation mode from starting an instruction that has already been issued. Forwarded results need not be immediately used so performance of the microarchitecture of the present invention is less sensitive to latencies than most computer microarchitectures. The present invention therefore sales more easily to larger numbers of execution units even if those units must be located on separate chips or separate circuit boards.

Profile Mapping Methods

The mapping method of the present invention creates data structures as programs execute to represent the flow of operands among instructions. The representation thus built is saved so that it is available for use in later executions of the same program. Such a saved mapping will be valid until the program is changed (assuming the program is not self modifying). An operand flow mapping thus saved can be loaded to a mapping representation.

Standalone Software Mapping

Operand flow mappings can also be generated by separate software that analyzes the executable code of programs and creates operand flow maps for that code. Such maps can then be accessed and used by processor hardware using the methods of the present invention.

Software Simulation

The microarchitecture of the present invention can be simulated by software programs for any instruction set architecture. A program running on a digital computer can simulate the execution of a program constructed for an Intel 80486 or an IBM S/370 or any other digital computer having instructions and operands. Such a simulator program can map the flow of operands between simulated instructions just as described for hardware implementations of the present invention.

A simulator program simulating the present invention could improve simulation performance in several ways. Operands that trigger execution of receiving simulated instructions in anticipation mode can be kept in faster storage such as the simulation platform's registers. If a program is being simulated on a machine having multiple processors, then forwardings and triggers that can cause parallel execution can be executed on separate processors. One loop might be simulated on one processor while a "subsequent" loop triggered by a forwarding around the first loop is simulated on a second processor. Operands that will not be used for some while can be shifted to slower storage while operands whose values will soon be needed can be promoted to faster storage.

A simulator program designed to execute on any stored program digital computer for simulation of another computer architecture (e.g., a Java Virtual Machine simulator) can be programmed to create flow mappings between simulated instructions. The simulation program can employ its operand flow mappings between simulated instructions to use multiple processors and to avoid extraneous storing and retrieving of operands by employing direct operand flow between simulated instructions. The simulator program can also reprogram the operand flows and transforms using native instructions of the host machine.

Where such a simulator program is executing on a machine embodying the methods of the present invention, it will benefit after several executions from the operand flow forwarding among simulator instructions but can benefit even more if the underlying machine architecture provides special instructions or mechanisms to accept flow mappings constructed by the simulator program as it executes the simulated program instructions. these flow mappings would forward operands among simulator program instructions compiled by the simulator program as it executes simulated program instructions (e.g., Java Virtual Machine instructions).

Operand Marking for Debugging

It is often a problem in testing and correcting computer programs to discover for some operand which instruction last changed that operand. Most computer systems will halt a program where division by zero is attempted but discovering how that operand became zero—which preceding instruction did it—can be difficult.

Annotating operands with the identity of instructions that created their values, as described above, together with a capability for computer programs to query the identity of value-creator instructions for selected operands provides an enhanced facility for testing as well as for more easily and quickly determining faulty instructions when programs crash in regular ("production") use.

This debug facility can be provided in conjunction with the other features described for the present invention or as a separate enhancement over prior art computer processors.

Preferred Embodiment

In the preferred embodiment operand flows are mapped in mapping mode and, where operand flows have been mapped, operands are forwarded and instructions triggered in anticipation mode. Operands are forwarded and target instructions triggered around branches where flows have been mapped. Speculation mode is not part of the preferred embodiment nor is loop explosion mode. The preferred embodiment maps and forwards only register operands. Each register operand retains a history of branches since it was last altered so that when an operand is used the mapping method can determine the branches via or around which it might be forwarded. Mapping is suspended for interrupts and page faults as is operand forwarding. The preferred embodiment does not bypass operand store/restore operations. The preferred embodiment will trigger instructions (such as operations having only immediate operands as input) with no input operands following their last predecessor branch. The preferred embodiment does not include metacode generation nor execution. Forwarded operands are tagged with branch slot numbers as shown in FIG. 16.

While the invention has been particularly shown and described with reference to preferred embodiments thereof it will be understood by those skilled in the art that various changes in form and details may be made therein without departing from the spirit and scope of the invention.

I claim:

1. A computer system having an instruction store for storing instructions, instruction fetching means for fetching instructions from the instruction store, and instruction execution means including one or more execution units for executing the instructions, and an instruction processing means comprising:

annotation store means for storing annotations associated with output operands from said execution means, each annotation for an output operand including a source instruction identifier for a source instruction that causes said output operand to be updated where said source instruction identifier identifies a location, independent of any particular one of said execution units from which the source instruction is accessed, updating means operating for each update of said output operand to update the source instruction identifier in the annotation.

2. The system of claim 1 wherein the operands are stored in general purpose registers.

3. The system of claim 1 wherein the operands are stored in control registers.

4. The system of claim 1 wherein the operands are stored in special registers.

5. The system of claim 1 wherein the operands are stored in floating point registers.

6. The system of claim 1 wherein the operands are condition codes.

7. The system of claim 1 wherein the operands are stored in vector registers.

8. The system of claim 1 wherein the operands are stack positions in a stack.

9. The system of claim 1 wherein the operands are stored in memory locations.

10. The system of claim 1 wherein said annotation includes identifiers for a history of branch instructions executed after said output operand was last updated.

11. The system of claim 10 wherein said annotation includes a forward branch indication for indicating a taken forward branch for a branch instruction executed after said output operand was last updated and said processing means fetches but does not execute intervening instructions between said taken forward branch and the target instruction of said taken forward branch, and if none of the intervening instructions would, if executed, update said output operand, if no further forward branch instructions are encountered between said taken forward branch instruction and the target instruction of said forward branch instruction, and if said system executes a target instruction that follows said target instruction of said taken forward branch instruction or is said target instruction of said taken forward branch instruction having said source instruction output operand as an input operand, said instruction processing means establishes a flow mapping association between said operand target instruction, said input operand and said source instruction if a valid instruction identifier is stored in said annotation store for said output operand.

12. The system of claim 1 wherein said annotation includes a forward branch indication for indicating a taken forward branch for a branch instruction executed after said output operand was last updated, said system executes a target instruction having said source instruction output operand as an input operand, and said instruction processing means does not establish a flow mapping association in response to said forward branch indication indicating a taken forward branch.

13. The system of claim 1 wherein said system executes a target instruction having said source instruction output operand as an input operand and where said instruction processing means establishes a flow mapping association between said target instruction, said input operand and said source instruction if a valid source instruction identifier is stored in said annotation store for said output operand.

14. The system of claim 13 wherein said output operand is an input operand to said target instruction and farther including, flow mapping store means for storing said flow mapping association as a flow map associated with said source instruction including a target instruction identifier for said target instruction and an operand identifier for said output operand.

15. The system of claim 14 wherein execution of the source instruction causes the output operand value of said source instruction to be forwarded as an input operand value to the target instruction.

16. The system of claim 15 wherein execution of said source instruction having said flow map stored causes the target instruction to be enabled for execution when said input operand value has been forwarded to the target instruction.

17. The system of claim 16 including compiler software for compiling executable instructions wherein said instructions are generated to simplify loops at the expense of executing more loops so that more execution is done in loops that execute through a constant number of iterations.

18. The system of claim 16 further including means for loading operand flow mapping information preserved from prior executions of a computer program or that results from analysis of computer programs into said flow mapping store means so operand flows are indicated before any initial execution of source or target instructions.

19. The system of claim 16 implemented as a computer program that executes on another computer.

20. The system of claim 16 implemented as a computer program that executes on another computer including multiple CPUs to increase speed.

21. The system of claim 16 wherein results of executing said triggered instruction are held in a retirement accumulation store that combines results of executing a plurality of individual instructions.

22. The system of claim 15 wherein said target instruction requires said input operand and one or more additional operands and where execution of said source instruction having said flow map stored causes the target instruction to be enabled for execution when said input operand value and said one or more additional operands have been forwarded to the target instruction.

23. The system of claim 15 wherein said source instruction and said target instruction are sent to an execution pipeline having a forwarding means responsive to a forwarding indication sent with said source instruction, said forwarding means forwarding said output operand from execution of said source instruction to an execution stage of said execution pipeline for use in executing said target instruction.

24. The system of claim 23 but wherein said forwarding means operates among multiple execution pipelines so that said output operand is sent from execution of said source instruction in one execution pipeline to the execution stage of another execution pipeline executing said target instruction.

25. The system of claim 15 further including means for generating and storing one or more metacode instructions in response to execution of program instructions or combinations of instructions and means for associating sequences of said metacode instructions with selected instructions.

26. The system of claim 25 wherein a sequence of said metacode instructions is triggered in response to subsequent execution of one of said selected instructions.

27. The system of claim 14 wherein said target instruction is a restore operation of the same operand and said target instruction is followed by a subsequent instruction that alters the value of said operand from some source not stemming from said source instruction or said target instruction and further including a conditional store suppression means responsive to retirement of said subsequent instruction that prevents the store operation of said source instruction.

28. The system of claim 14 wherein said target instruction identifier in said flow mapping association is an address offset relative to a source instruction address.

29. The system of claim 13 where the annotation store means is augmented with addition of an original source instruction operand annotation where said original source instruction operand annotation is updated when a transitive target instruction of an original source instruction copies an original value originating in the original source instruction into a new output operand and where in response to processing a last target instruction having said new output operand as an input operand, said processing means establishes a flow mapping association between said original source instruction and said last target instruction.

30. The system of claim 29 wherein said transitive target instruction copies the value of said new output operand in a direct transformation of said original value with no other inputs.

31. The system of claim 30 wherein said original value is a half-word integer value and said new output operand is a full-word integer value.

32. The system of claim 30 wherein said original value is an integer and said new output operand is a binary coded decimal value.

33. The system of claim 13 wherein said flow mapping association between a store and a subsequent restore operation is augmented with a conditional suppression means responsive to a restore suppression indicator that will act to prevent said subsequent restore operation.

34. The system of claim 13 further including means for preserving said operand flow mapping information during or after execution of a computer program.

35. The system of claim 13 wherein said flow maps further include operation codes of target instructions so that said target instructions can be executed without fetching target instructions.

36. The system of claim 13 wherein said output operand is an input operand to said target instruction and further including,
flow mapping store means for storing said flow mapping association as a flow map including a target instruction identifier for said target instruction, an operand identifier for said output operand.

37. The system of claim 13 wherein execution of said source instruction further causes storage of a retirement template for said output operand.

38. The system of claim 37 wherein wide template words each store a plurality of output operands from one or more source instructions.

39. The system of claim 1 wherein said system executes one or more target instructions, each target instruction having said source instruction output operand as an input operand, said instruction processing means establishing one or more flow mapping associations, each flow mapping an association between one of said target instructions, said input operand and said source instruction if a valid source instruction identifier is stored in said annotation store for said output operand.

40. The system of claim 39 wherein said output operand is an input operand to said one or more target instructions and further including,
flow mapping store means for storing said flows as flow maps each flow map associated with said source instruction including one of said target instruction identifiers for one of said target instructions and an operand identifier for said output operand.

41. The system of claim 40 wherein execution of the source instruction causes the output operand value of said source instruction to be forwarded as an input operand value to said one or more target instructions.

42. The system of claim 41 wherein execution of said source instruction having said flow maps stored causes the target instructions to be enabled for execution when said input operand value has been forwarded to the target instructions.

43. The system of claim 42 wherein one or more of said target instructions requires said input operand and one or more additional operands and where execution of said source instruction having said flow maps stored causes said one or more of the target instructions to be enabled for execution when said input operand value and said one or more additional operands have been forwarded to the target instructions.

44. The system of claim 43 wherein execution of all of said source instructions having said flow maps stored causes the target instruction to be enabled for execution when all of said input operand values have been forwarded to the target instruction.

45. The system of claim 42 wherein execution of each of said source instructions causes the corresponding output operand values of each of said said source instructions to be forwarded as corresponding input operand values to the target instruction.

46. The system of claim 41 wherein said output operand is an input operand to a target instruction and further including,
flow mapping store means for storing said flows as flow maps associated with said source instructions, each flow map including a target instruction identifier for said target instruction and one or more operand identifiers for said one or more output operands, respectively.

47. The system of claim 40 wherein said system executes a target instruction having one or more of said source instruction output operands as one or more input operands, respectively, said instruction processing means establishing one or more flows, each flow mapping an association between said target instruction, one of said input operands and one of said source instructions if a source instruction identifier is stored in said annotation store for a corresponding one of said output operands.

48. The system of claim 39 wherein said output operand is an input operand to said one or more target instructions and further including, flow mapping store means for storing said flows as flow maps each flow map including one of said target instruction identifiers for one of said target instructions, and an operand identifier for said output operand.

49. The system of claim 1 wherein, said annotation store means stores annotations for a plurality of source instructions, said annotations including source instruction identifiers corresponding to said source instructions that cause corresponding output operands to be updated where said source instruction identifiers identify locations, independent of any particular one of said execution units, from which the source instructions are accessed.

50. The system of claim 49 wherein said system executes a target instruction having one or more of said source instruction output operands as one or more input operands, respectively, said instruction processing means establishing one or more flows, each flow mapping an association between said target instruction, one of said input operands and one of said source instructions if a source instruction identifier is stored in said annotation store for a corresponding one of said output operands.

51. The system of claim 50 wherein said output operand is an input operand to a target instruction and further including, flow mapping store means for storing said flows as flow maps associated with said source instructions, each flow map including a target instruction identifier for said target instruction and one of said operand identifiers for a corresponding one of said output operands, respectively.

52. The system of claim 51 wherein execution of each of said source instructions causes the corresponding output operand values of each of said source instructions to be forwarded as corresponding input operand values to the target instruction.

53. The system of claim 52 wherein execution of all of said source instructions having said flow maps stored causes the target instruction to be enabled for execution when all of said input operand values have been forwarded to the target instruction.

54. The system of claim 49 wherein said system executes one or more target instructions, each target instruction having one or more of said source instruction output operands as input operands, said instruction processing means establishing one or more flows, each flow mapping an association between one of said target instructions, one of said input operands and a corresponding one of said source instructions if a corresponding one of said source instruction identifiers is stored in said annotation store for said one of said output operands.

55. The system of claim 54 wherein said one or more output operands are input operands to one or more target instructions and further including, flow mapping store means for storing said flows as flow maps associated with said source instructions, each flow map including one of said target instruction identifiers for a corresponding one of said target instructions one of said operand identifiers for a corresponding one of said output operands.

56. The system of claim 55 wherein execution of each of said source instructions causes the corresponding output operand values of each of said source instructions to be forwarded as corresponding input operand values to each of said target instructions.

57. The system of claim 56 wherein execution of said source instructions having said flow maps stored causes the corresponding target instructions to be enabled for execution, each particular one of said target instructions enabled when said corresponding input operand values for said particular one of said target instructions have been forwarded to the particular one of said target instructions.

58. The system of claim 54 wherein said one or more output operands are input operands to one or more target instructions and further including, flow mapping store means for storing said flows as flow maps, each flow map including one of said target instruction identifiers for a corresponding one of said target instructions, one of said output operand identifiers for a corresponding one of said output operands.

59. The system of claim 1 wherein the instruction processing means includes storage means for storing a retirement count of instructions that have been executed and retired and said retirement count is incremented in response to retirement of each executed instruction and said annotation store means includes storage for the retirement count and the instruction identifier of a source instruction that last updated said output operand.

60. The system of claim 59 wherein said processing means does not establish a flow mapping association in response to said retirement count of said source instruction having more than a preset difference from an instruction retirement count of said operand target instruction.

61. The system of claim 1 augmented by a debugging means responsive to operand-related errors wherein, when an error is indicated said source instruction identifier is made available from said annotation store to identify the last instruction to update an operand causing said error.

62. The system of claim 61 wherein said source instruction identifier is stored into an error-operand storage means.

63. The system of claim 61 wherein said source instruction identifier is made available to a display means.

64. The system of claim 1 wherein said instructions are stored and fetched in packets comprising multiple instructions.

65. The computer system of claim 1 including a computer program that simulates the forwarding of operands between instructions in one or more simulated programs by means of establishing mappings of operand forwarding between simulated instructions.

66. In a computer system having an instruction store for storing instructions and instruction execution means for executing the instructions, instruction processing means for fetching instructions from the instruction store for execution comprising:

means for processing a source instruction for updating an output operand, means for processing an instruction loop including,
a target instruction which uses the output operand,
a loop-back branch instruction for branching so that said target instruction is executed for each iteration of the loop, annotation store means for storing annotations associated with said output operand, each annotation including a source instruction identifier for said source instruction, said annotation including a history of executions of branch instructions, including a history of taken branches and not-taken branches taken after said output operand was last updated, said branch instructions including said loop-back branch instruction, updating means operating for each update of said output operand to update the source instruction identifier in the annotation and operating for each execution of said branch instructions to update said branch history, means for establishing flows for mapping associations between said target instruction, said output operand and said source instruction, means for establishing a conditional flow from said loop-back branch instruction to said target instruction if the history in the annotation store means indicates that the last execution of a branch instruction was said loop-back branch instruction in which the branch was taken after said output operand was last updated.

67. The computer system of claim 66 further including, means for establishing an unconditional flow from said source instruction to said loop-back branch instruction if the history in the annotation store means indicates that the last execution of a branch instruction was said loop-back branch instruction in which the branch was taken after said output operand was last updated and if said loop-back branch instruction branches to a branch-to instruction that is said source instruction or that is before said source instruction.

68. The computer system of claim 66 further including, means for establishing an unconditional flow from said source instruction to said loop-back branch instruction if the history in the annotation store means indicates that the last execution of a branch instruction was said loop-back branch instruction in which the branch was taken after said output operand was last updated and if said loop-back branch instruction branches to a branch-to instruction that is said source instruction or that is after said source instruction, means for establishing a conditional flow from said loop-back branch instruction to said loop-back branch instruction if the history in the annotation store means indicates that the last execution of a branch instruction was said loop-back branch instruction in which the branch was taken after said output operand was last updated and if said loop-back branch instruction branches to a branch-to instruction that is said source instruction or that is after said source instruction.

69. The system of claim 68 wherein a program loop is exited under predetermined conditions and wherein outputs of instructions within said loop have been determined and operand flows of instructions within said loop have been mapped, said system further including means for executing post-loop instructions following loop exit in an anticipation mode such that results are not available, until after retirement of a loop exit instruction, for all said post-loop instructions that precede a first instruction having an input operand that is an output operand from one of said loop instructions and further including means for mapping operand flows among said post-loop instructions.

70. The system of claim 66 wherein instances of output operands from execution of said source instructions in a program loop are each annotated with a branch occurrence identifier and where said branch occurrence identifier corresponds to execution instances of taken branches of said loop-back branch as if all backward branch instructions were executed in normal program order and where said branch occurrence identifier further includes the static identity of the loop-back branch instruction.

71. The system of claim 70 wherein instances of output operands generated in instructions occurring before a target of said loop-back branch instruction are copied and forwarded via flow mapping that is unconditional and said instances of output operands are annotated with said branch occurrence identifier.

72. The system of claim 70 wherein operands having identical branch occurrence identifiers and identical operand target instructions are combined as input operands to instructions requiring multiple input operands.

73. The system of claim 70 wherein said loop-back branch occurrence identifier is reverted to a value in effect before a first execution of said loop-back branch instruction for instructions following an untaken instance of a loop-back branch instruction.

74. The system of claim 73 wherein result values from executing instructions are annotated with said loop-back branch occurrence identifiers and said values are materialized to program visible storage only after retirement of branch instances of said loop-back branches whether said branches are taken or not taken.

75. The system of claim 70 further including storage means for storing branch paths of executed instances of forward branching and backward branching branch instructions.

76. The system of claim 70 wherein branch instances are executed and branch paths are chosen prior to determination of correct paths from said branch instances; wherein results and further path directions are marked as speculative; wherein said results are discarded following detection of a mispredicted branch direction; or wherein said results are materialized in program visible storage only after confirmation of direction and retirement of preceding branch instructions.

77. The system of claim 66 further including means for detecting that a target instruction of said output operand being forwarded via said loop-back branch to said target instruction is also said source instruction of said forwarded operand and where said target instruction is operating on said forwarded operand to create a change that is either a constant immediate value or is another value that is not altered between the loop-back branch and the target instruction of the loop-back branch and where the loop-back branch is conditional on a loop control operand that is set to a constant by an instruction occurring before the target instruction of said loop-back branch and is increased or decreased by a constant value between the loop-back branch and the target of the loop-back branch and further including means for storing an annotation that said target instruction is to be executed a determined number of times.

78. The system of claim 77 further including means for identifying and storing annotations of operand flows where an operand is modified by adding or subtracting or multiplying or dividing by constant values by a plurality of modification instructions between a loop-back branch and the target instruction of the loop-back branch and further including means for storing annotations that said modifying instructions are to be executed a determined number of times.

79. The system of claim 78 further including means for simultaneously or substantially simultaneously issuing a plurality of instances of said target instruction with a plurality of values of an input operand to said target instruction with one instance having an initial value and each other instance of said input operand having a value that is increased or decreased or multiplied or divided by a constant value from the initial value and where said constant might have value zero or one resulting in all instances of the input operand having the same value.

80. In a computer system having an instruction store for storing instructions and instruction execution means for executing the instructions, instruction processing means for fetching instructions from the instruction store for execution comprising:

means for processing a source instruction for updating an output operand, means for processing an instruction loop including, one or more loop instructions,
    a loop-back branch instruction for branching so that said loop instructions are executed for each iteration of the loop, means for processing a target instruction which uses the output operand, annotation store means for storing annotations associated with said output operand, each annotation including a source instruction identifier for said source instruction, said annotation including a history of executions of branch instructions, including a history of taken branches and not-taken branches taken after said output operand was last updated, said branch instructions including said loop-back branch instruction, updating means operating for each update of said output operand to update the source instruction identifier in the annotation and operating for each execution of said branch instructions to update said branch history, means for establishing flows for mapping associations between said target instruction, said output operand and said source instruction, means for establishing a flow from said source instruction to said target instruction if the history in the annotation store means indicates that the last execution of a branch instruction was said loop-back branch instruction in which the branch was not-taken after said output operand was last updated and if said loop-back branch instruction branches to a branch-to instruction that is after said source instruction.

81. In a computer system having an instruction store for storing instructions, instruction fetching means for fetching instructions from the instruction store, and instruction execution means for executing the instructions, an instruction processing means comprising:

means for processing a source instruction for updating an output operand, means for processing one or more intervening instructions, means for processing a branch-forward branch instruction for branching so that said intervening instructions are conditionally bypassed, means for processing a target instruction which uses said output operand, annotation store means for storing annotations associated with said output operand, each annotation including a source instruction identifier for said source instruction, said annotation including a history of executions of branch instructions, including a history of taken branches and not-taken branches taken after said output operand was last updated, said branch instructions including said branch-forward branch instruction, updating means operating for each update of said output operand to update the source instruction identifier in the annotation and operating for each execution of said branch instructions to update said branch history, means for establishing flows for mapping associations between said target instruction, said output operand and said source instruction, means for establishing a flow from said source instruction to said target instruction if the history in the annotation store means indicates that the last execution of a branch instruction was said branch-forward branch instruction in which the branch was not-taken after said output operand was last updated and if said branch-forward branch instruction branches to a branch-to instruction that is said target instruction or is before said target instruction.

82. In a computer system having an instruction store for storing instructions and instruction execution means for executing the instructions, instruction processing means for fetching instructions from the instruction store for execution comprising:

means for processing a source instruction for updating an output operand, means for processing a target instruction which uses said output operand, means for processing a branch-forward branch instruction for branching so that said target instruction is conditionally bypassed, annotation store means for storing annotations associated with said output operand, each annotation including a source instruction identifier for said source instruction, said annotation including a history of executions of branch instructions, including a history of taken branches and not-taken branches taken after said output operand was last updated, said branch instructions including said branch-forward branch instruction, updating means operating for each update of said output operand to update the source instruction identifier in the annotation and operating for each execution of said branch instructions to update said branch history, means for establishing flows for mapping associations between said target instruction, said output operand and said source instruction, means for establishing a conditional flow from said source instruction to said target instruction if the history in the annotation store means indicates that the last execution of a branch instruction was said branch-forward branch instruction in which the branch was not-taken after said output operand was last updated and if said branch-forward branch instruction branches to a branch-to instruction that is after said target instruction.

83. In a computer system having an instruction store for storing instructions and instruction execution means including one or more execution units for executing the instructions, an instruction processing method for fetching instructions from the instruction store comprising:

storing annotations associated with output operands from said execution means, each annotation for an output operand including a source instruction identifier for a source instruction that causes said output operand to be updated where said source instruction identifier identifies a location, independent of any particular one of said execution units from which the source instruction is accessed, updating, for each update of said output operand, the source instruction identifier in the annotation.

84. The method of claim 83 wherein said annotation includes a forward branch indication for indicating a taken forward branch for a branch instruction executed after said output operand was last updated, wherein said system executes a target instruction having said source instruction output operand as an input operand, and wherein said instruction processing method does not establish a flow mapping association in response to said forward branch indication indicating a taken forward branch.

85. The method of claim 83 wherein said system executes a target instruction having said source instruction output operand as an input operand and where said instruction processing method establishes a flow mapping association between said target instruction, said input operand and said source instruction if a source instruction identifier is stored in said annotation store for said output operand.

* * * * *